(12) United States Patent
Woolmer

(10) Patent No.: US 9,071,117 B2
(45) Date of Patent: Jun. 30, 2015

(54) ELECTRIC MACHINE—FLUX

(75) Inventor: Tim Woolmer, Oxford (GB)

(73) Assignee: Isis Innovation LTD., Oxford (GB)

( * ) Notice: Subject to any disclaimer, the term of this patent is extended or adjusted under 35 U.S.C. 154(b) by 655 days.

(21) Appl. No.: 13/148,863

(22) PCT Filed: Feb. 12, 2010

(86) PCT No.: PCT/GB2010/050237
§ 371 (c)(1),
(2), (4) Date: Aug. 10, 2011

(87) PCT Pub. No.: WO2010/092403
PCT Pub. Date: Aug. 19, 2010

(65) Prior Publication Data
US 2011/0309694 A1 Dec. 22, 2011

(30) Foreign Application Priority Data
Feb. 13, 2009 (GB) .................................. 0902390.4

(51) Int. Cl.
*H02K 29/03* (2006.01)
*H02K 21/12* (2006.01)
*H02K 21/24* (2006.01)

(52) U.S. Cl.
CPC ................ *H02K 21/24* (2013.01); *H02K 29/03* (2013.01); *H02K 2201/06* (2013.01)

(58) Field of Classification Search
CPC ............................... H02K 21/12; H02K 21/24
USPC ..................... 310/266, 156.32, 268, 216.084, 310/216.085, 216.079, 216.091
See application file for complete search history.

(56) References Cited

U.S. PATENT DOCUMENTS 2,606,946 A 8/1952 Fisher
3,217,193 A 3/1963 Rayner
(Continued)

FOREIGN PATENT DOCUMENTS

DE 19600612 7/1997
EP 0484548 5/1992
(Continued)

OTHER PUBLICATIONS

International Preliminary Report on Patentability and Written Opinion, dated Aug. 16, 2011, received from The International Bureau of WIPO.
(Continued)

*Primary Examiner* — Terrance Kenerly
(74) *Attorney, Agent, or Firm* — Meunier Carlin & Curfman, LLC

(57) ABSTRACT

An electric machine (10; 100) comprises a rotor (14) having permanent magnets (24) and a stator (12) having coils (22) wound on stator bars (16) for interaction with the magnets across an air gap (26*a*, *b*) defined between them. The rotor has two stages (14*a*, *b*) arranged one at either end of the bars. The bars have a shoe (18*a*, 8) at each end of each bar that links magnetic flux through the bars with said magnets on each stage. Adjacent shoes facing the same stage of the rotor have a high-reluctance shoe gap (27) between them; adjacent magnets on each stage of the rotor have a high-reluctance magnet gap (25) between them; and the shoe and magnet gaps (25, 27) are angled with respect to each other such that they engage progressively as the rotor rotates. Alternatively, the shoes facing each stage are in a ring of connected shoes such that the magnets experience a continuous reluctance that is at least 90% constant as a function of rotor position. The bars (16) and shoes (18) are formed separately from one another and at least a part of each is formed by moulding soft-iron particles so that the particles have a short dimension that is arranged transverse a reluctance-plane. The bars and shoes are assembled so that the reluctance-plane of the bar is parallel a longitudinal axis (16*a*) of the bar and said reluctance-plane of the shoe is transverse said longitudinal axis.

16 Claims, 11 Drawing Sheets

(56) References Cited

U.S. PATENT DOCUMENTS

| | | | |
|---|---|---|---|
| 3,150,277 | A | 9/1964 | Chubb et al. |
| 3,413,503 | A | 11/1968 | Parker |
| 4,082,971 | A | 4/1978 | Miyake et al. |
| 4,435,662 | A | 3/1984 | Tawse |
| 4,447,750 | A | 5/1984 | Howlett et al. |
| 4,464,592 | A | 8/1984 | Major |
| 5,334,899 | A | 8/1994 | Skybyk |
| 5,345,777 | A | 9/1994 | Sekino |
| 5,355,039 | A | 10/1994 | Couture |
| 5,394,040 | A | 2/1995 | Khanh |
| 5,517,072 | A | 5/1996 | Hildebrandt |
| 5,578,879 | A | 11/1996 | Heidelberg et al. |
| 5,894,902 | A | 4/1999 | Cho |
| 5,910,697 | A | 6/1999 | Sromin et al. |
| 5,982,070 | A * | 11/1999 | Caamano ............... 310/216.047 |
| 6,100,615 | A | 8/2000 | Birkestrand |
| 6,286,616 | B1 | 9/2001 | Kutter |
| 6,304,011 | B1 | 10/2001 | Pullen et al. |
| 6,355,996 | B1 | 3/2002 | Birkestrand |
| 6,488,486 | B1 | 12/2002 | Debleser |
| 6,515,384 | B1 | 2/2003 | Kikuchi |
| 6,720,688 | B1 | 4/2004 | Schiller |
| 6,849,982 | B2 | 2/2005 | Haydock |
| 6,903,471 | B2 | 6/2005 | Arimitsu et al. |
| 6,922,004 | B2 | 7/2005 | Hashimoto |
| 7,002,277 | B2 * | 2/2006 | Yamamoto et al. .... 310/216.001 |
| 7,135,800 | B2 | 11/2006 | Yamada et al. |
| 7,227,286 | B2 | 6/2007 | Kudo et al. |
| 7,411,325 | B1 | 8/2008 | Gabrys |
| 7,445,067 | B2 | 11/2008 | Marsh |
| 7,728,447 | B2 | 6/2010 | Becquerelle et al. |
| 8,264,107 | B2 | 9/2012 | Jee |
| 2004/0145252 | A1 | 7/2004 | Arimitsu et al. |
| 2004/0164641 | A1 | 8/2004 | Yamada et al. |
| 2004/0174087 | A1 * | 9/2004 | Heidrich ....................... 310/218 |
| 2005/0035676 | A1 | 2/2005 | Rahman et al. |
| 2005/0140244 | A1 * | 6/2005 | Yamada et al. ............... 310/268 |
| 2006/0091761 | A1 | 5/2006 | Lafontaine |
| 2006/0103263 | A1 | 5/2006 | Naito et al. |
| 2006/0113856 | A1 | 6/2006 | Tanno |
| 2006/0279150 | A1 | 12/2006 | Kojima |
| 2007/0018520 | A1 | 1/2007 | Kaneko et al. |
| 2007/0046124 | A1 | 3/2007 | Aydin et al. |
| 2007/0138876 | A1 * | 6/2007 | Evans et al. ...................... 310/10 |
| 2007/0199339 | A1 | 8/2007 | Ishihara et al. |
| 2008/0099258 | A1 | 5/2008 | Berhan |
| 2009/0025830 | A1 * | 1/2009 | Uozumi et al. ............... 148/312 |
| 2009/0218540 | A1 * | 9/2009 | Takami et al. ............. 252/62.57 |
| 2011/0156519 | A1 * | 6/2011 | Wang et al. .................... 310/114 |

FOREIGN PATENT DOCUMENTS

| | | |
|---|---|---|
| EP | 1292004 | 3/2003 |
| EP | 1739810 A2 | 1/2007 |
| FR | 2823382 | 10/2002 |
| GB | 2379093 A | 2/2003 |
| JP | S50-88510 | 7/1975 |
| JP | 62201034 | 9/1987 |
| JP | 63209455 | 8/1988 |
| JP | 05185847 | 1/1992 |
| JP | 04359653 | 12/1992 |
| JP | 05091696 | 4/1993 |
| JP | 2011178310 A | 7/1999 |
| JP | 2002281722 | 9/2002 |
| JP | 2003088032 | 3/2003 |
| JP | 2004274838 | 9/2004 |
| JP | 2004312984 | 11/2004 |
| JP | 2005151725 | 6/2005 |
| JP | 2005224054 A | 8/2005 |
| JP | 2005253188 | 9/2005 |
| JP | 2005261083 | 9/2005 |
| JP | 2006014522 | 1/2006 |
| JP | 2006033965 A | 2/2006 |
| JP | 2006248417 | 9/2006 |
| JP | 2006304474 | 11/2006 |
| JP | 2007060748 | 3/2007 |
| JP | 2007143365 | 6/2007 |
| JP | 2008079397 | 4/2008 |
| JP | 2008131684 | 6/2008 |
| SE | 384766 | 5/1976 |
| SU | 551763 | 3/1977 |
| SU | 955379 | 8/1982 |
| WO | 9807227 | 2/1998 |
| WO | 0048294 A1 | 8/2000 |
| WO | 03094327 A1 | 11/2003 |
| WO | 2006066740 A1 | 6/2006 |
| WO | 2007141489 A2 | 12/2007 |
| WO | 2008032430 | 3/2008 |
| WO | 2008091035 | 7/2008 |
| WO | 2010092400 | 8/2010 |
| WO | 2010092402 | 8/2010 |
| WO | 2010119281 | 10/2010 |

OTHER PUBLICATIONS

International Search Report, dated May 6, 2011, received from the European Patent Office.
Woolmer, T.J. et al., "Analysis of the Yokeless and Segmented Armature Machine", International Electric Machines and Drives Conference (IEMDC), Antalya, Turkey, May 3-5, 2007, 7 pages.
English Translation of Japanese Office Action issued Feb. 25, 2014, in related Japanese Application No. 2011-549676.
English Translation of Japanese Office Action issued Mar. 18, 2014 for Japanese Application No. 2012-505237.
English Translation of Japanese Office Action issued Mar. 18, 2014 for Japanese Application No. 2011-549677.
Final Office Action issued in U.S. Appl. No. 14/049,322 on Aug. 20, 2014.
Final Office Action issued in U.S. Appl. No. 13/148,871 dated Jun. 2, 2014.
International Preliminary Report on Patentability and Written Opinion, dated Oct. 18, 2011, received in International Application No. PCT/GB2010/050613.
International Preliminary Report on Patentability and Written Opinion, dated Aug. 16, 2011, received in International Application No. PCT/GB2010/050234.
International Search Report, dated Mar. 17, 2011, received in International Application No. PCT/GB2010/050613.
International Search Report, dated May 6, 2011, received in International Application No. PCT/GB2010/050234.
Office Action for U.S. Appl. No. 14/049,322 dated Jan. 31, 2014.
Related U.S. Appl. No. 13/258,839, filed on Sep. 22, 2011.
Related U.S. Appl. No. 13/148,871, filed on Aug. 10, 2011.
Related U.S. Appl. No. 13/148,897, filed on Aug. 10, 2011.
Office Action for U.S. Appl. No. 13/148,897 dated Mar. 28, 2014.
International Preliminary Report on Patentability and Written Opinion, dated Aug. 16, 2011, received in International Application No. PCT/GB2010/050236.
International Search Report, dated Jul. 9, 2010, received in International Application No. PCT/GB2010/050236.
Office Action for U.S. Appl. No. 13/148,871 dated Dec. 6, 2013.
Restriction Requirement received in related U.S. Appl. No. 13/148,897 on Dec. 6, 2013.
English Translation of Japanese Office Action issued Feb. 25, 2014, in related Japanese Application No. 2011-549678.
Final Office Action received in related U.S. Appl. No. 13/148,897 on Jan. 8, 2015.
Advisory Action received in related U.S. Appl. No. 14/049,322 on Nov. 6, 2014.
Machine Translation of Foreign Reference JP2006033965.
Office Action received in related U.S. Appl. No. 13/148,871 on Jan. 2, 2015.
Advisory Action issued in U.S. Appl. No. 13/148,871 on Sep. 22, 2014.
Office Action issued in related JP Application No. 2011-549676 issued Oct. 28, 2014.

* cited by examiner

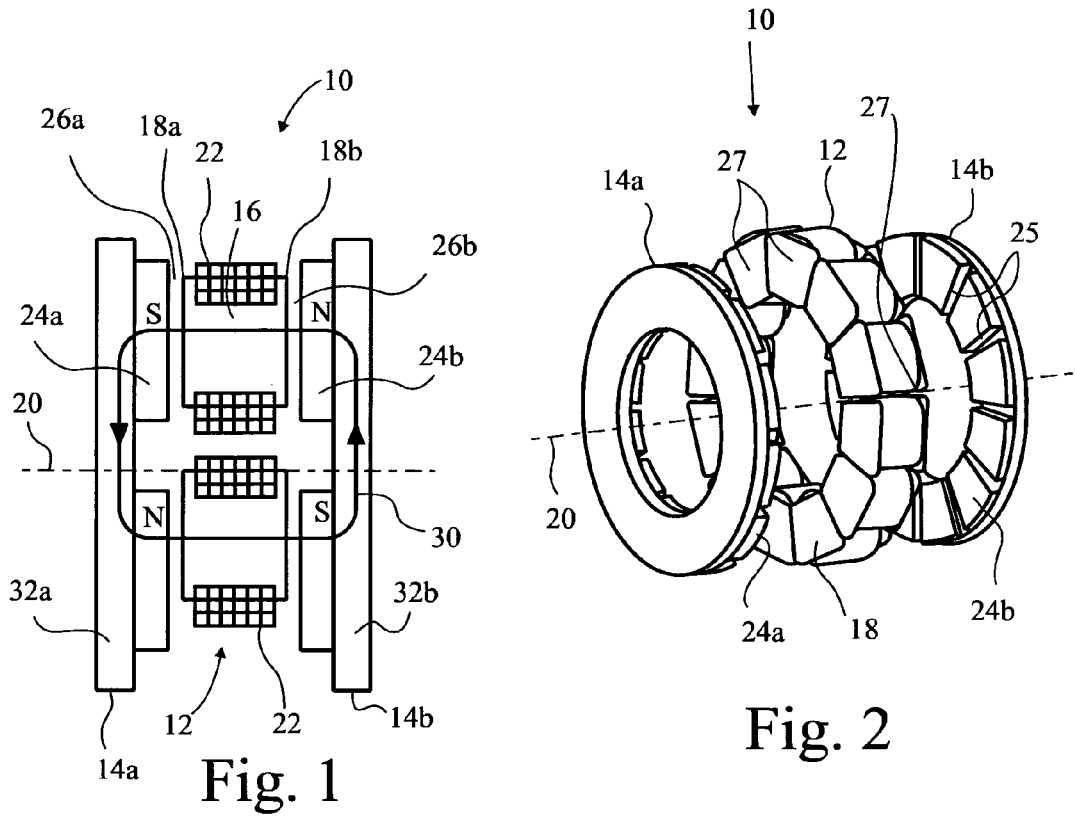
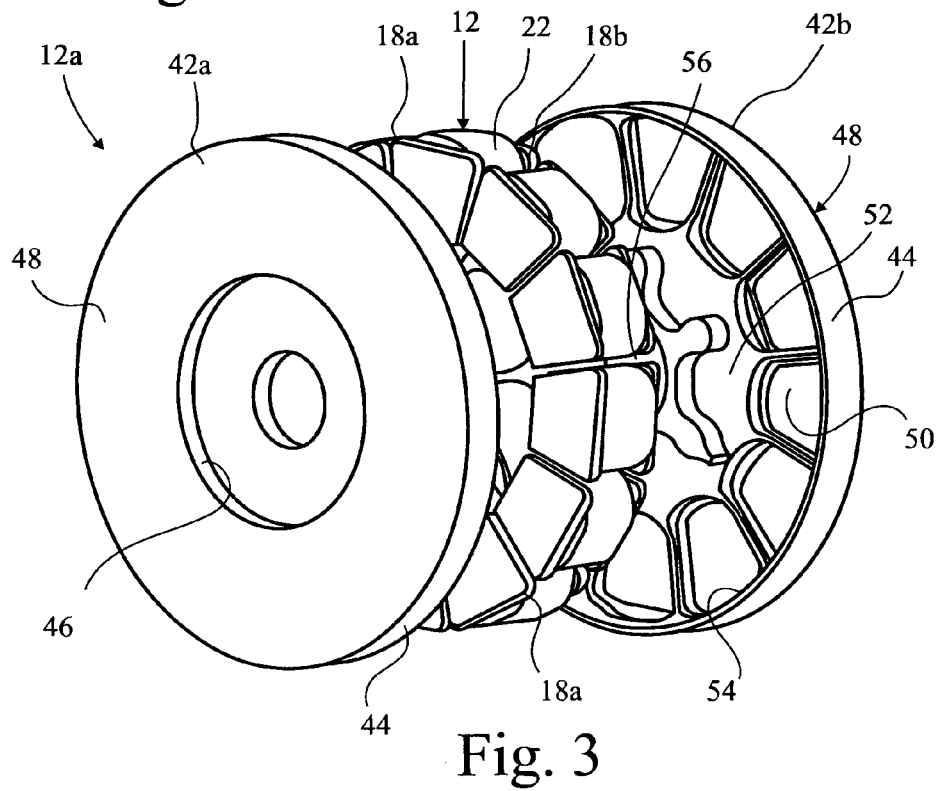

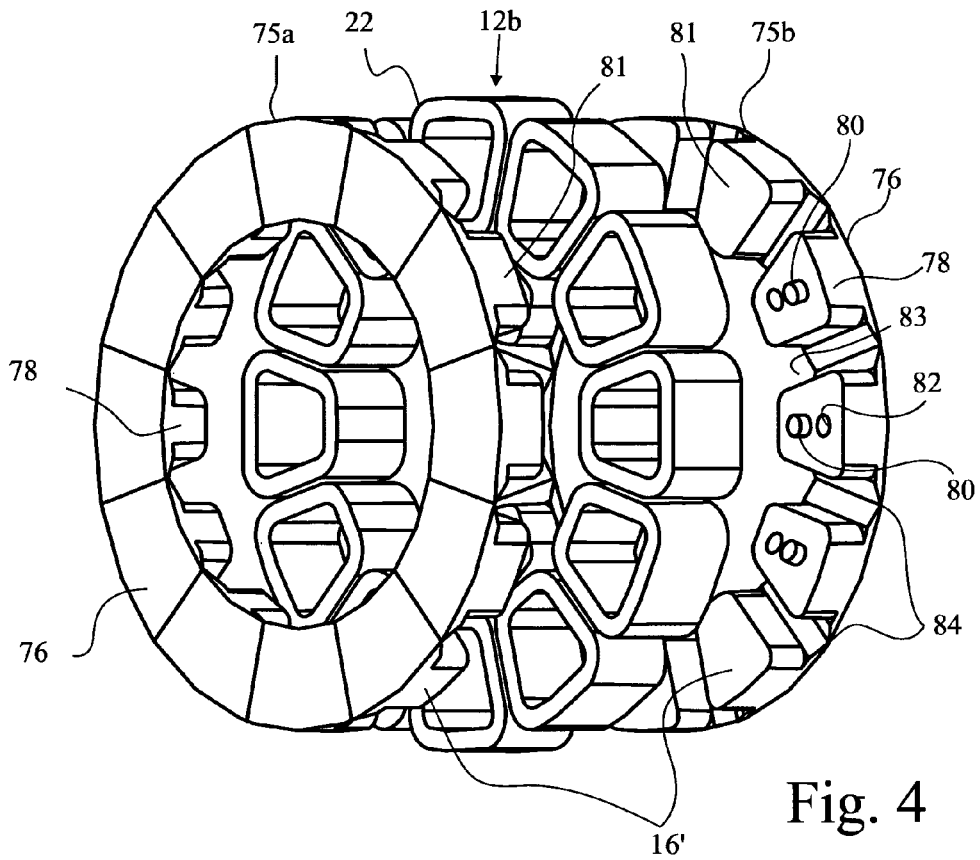
Fig. 4
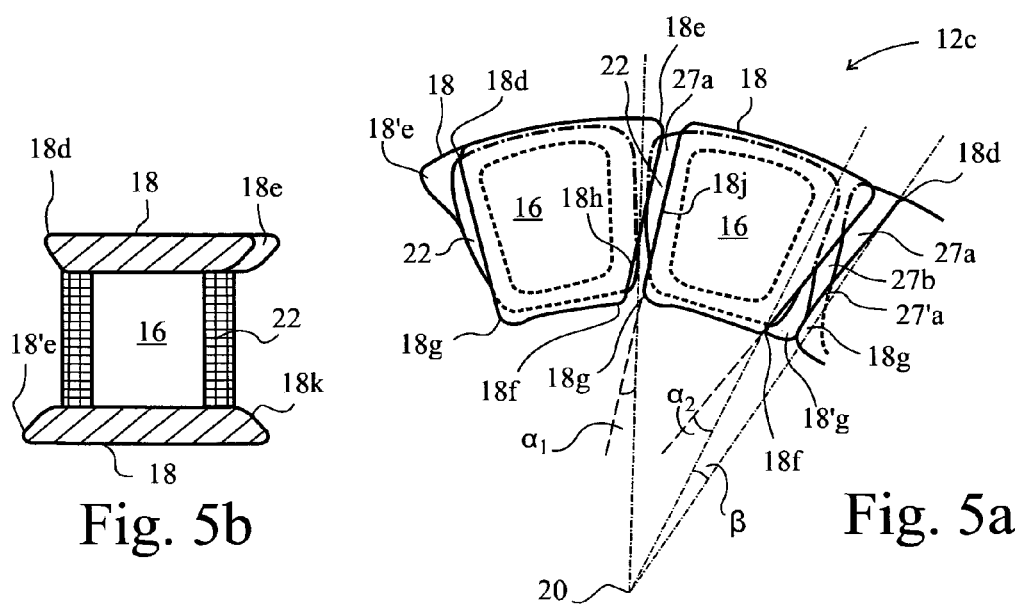
Fig. 5b
Fig. 5a

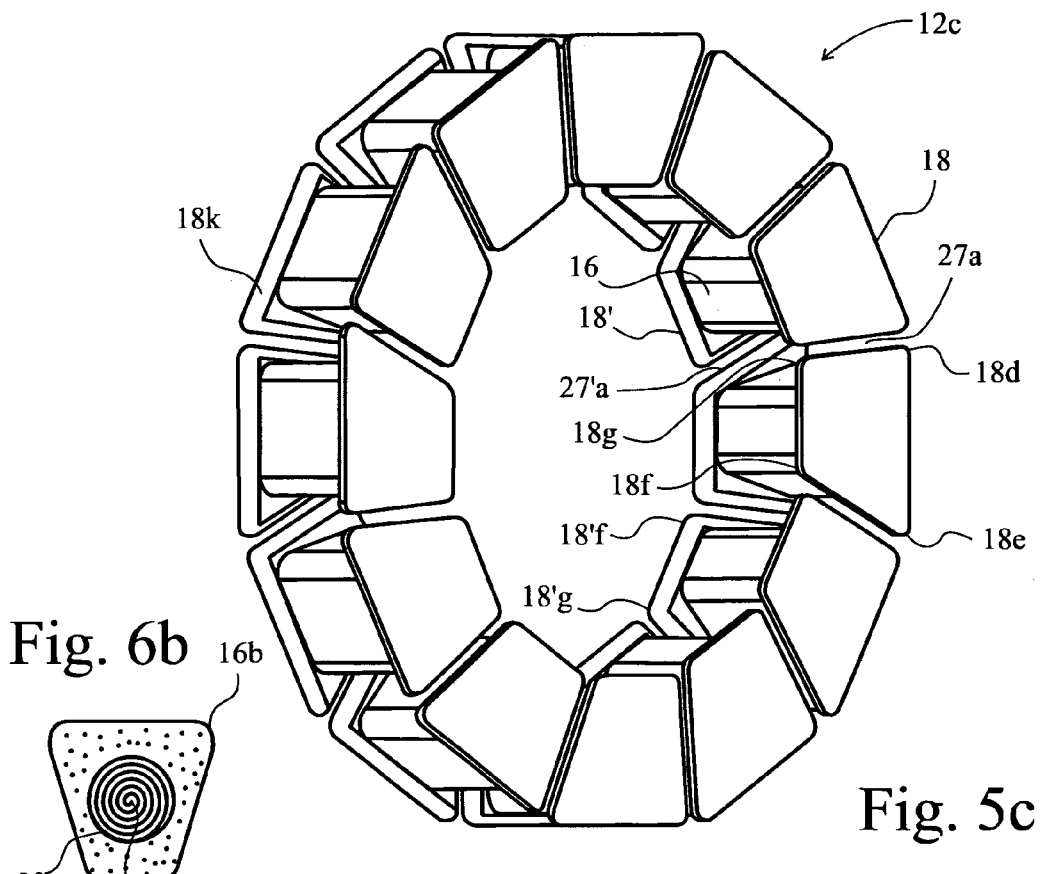
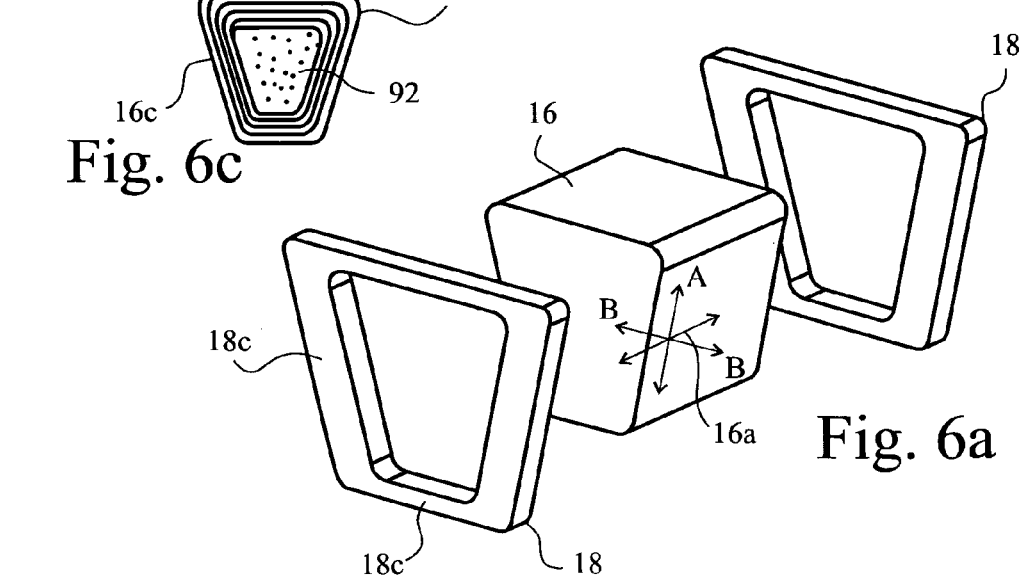

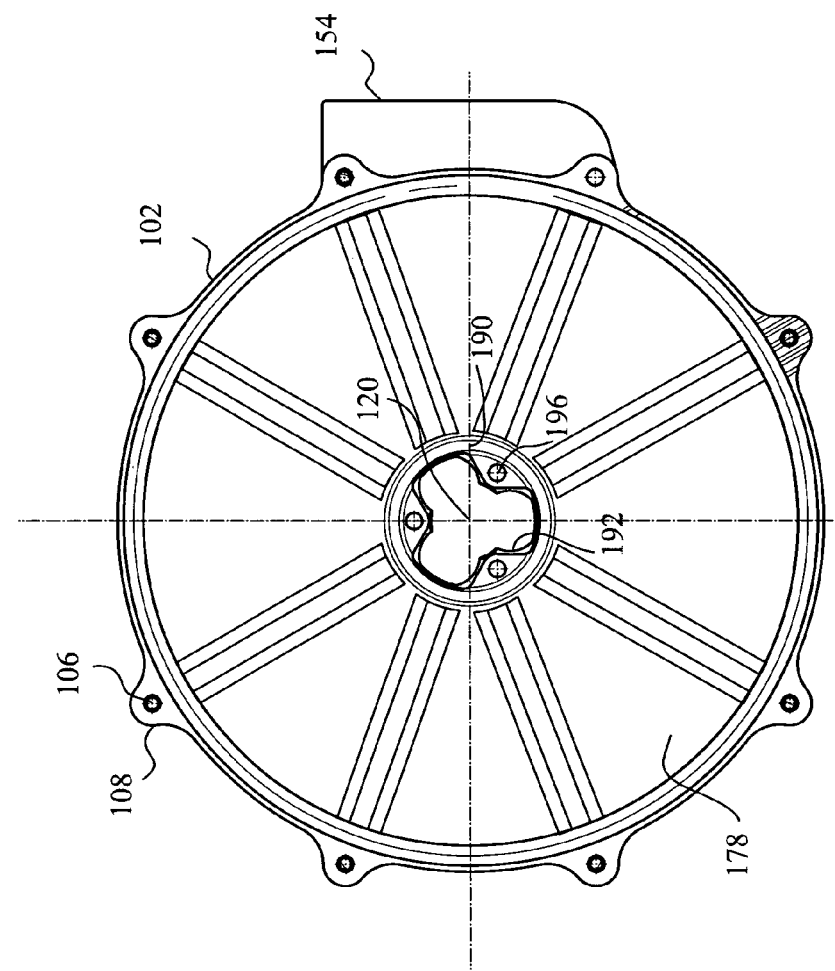
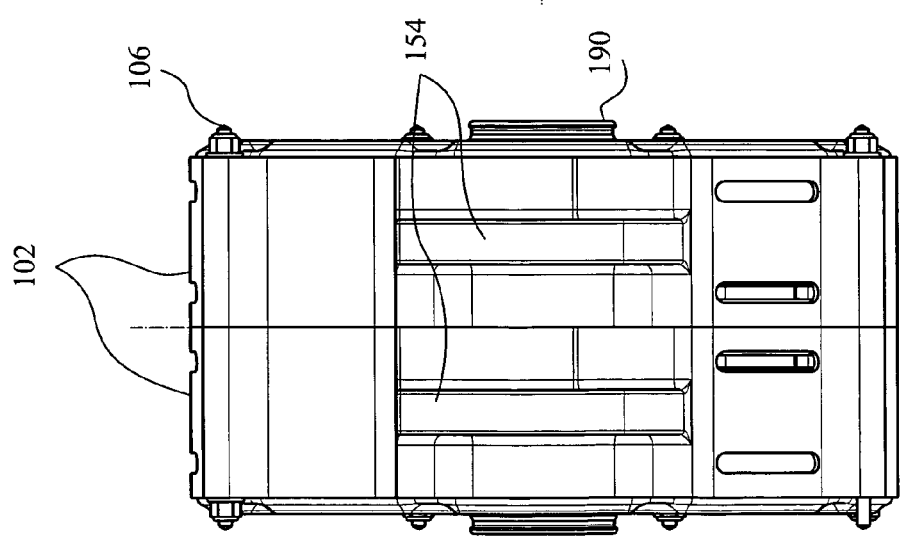

ELECTRIC MACHINE—FLUX

CROSS REFERENCE TO RELATED APPLICATIONS

This application is a 35 USC 371 national phase of International Application No. PCT/GB2010/050237 filed Feb. 12, 2010, which claims priority to U.K. Patent Application No. 0902390.4 filed Feb. 13, 2009, the contents of all of which are hereby incorporated herein by reference in their entirety.

This invention relates to a permanent magnet electric machine comprising a stator and a rotor journalled for rotation in the stator. The stator is provided with coils wound on and the rotor is provided with permanent magnets to cooperate with the coils across an air gap between the rotor and stator. The machine may be either a motor or a generator and is in many embodiments an axial flux machine. In particular it relates to a yokeless and segmented armature machine, hereinafter termed a "Y machine".

BACKGROUND

Woolmer and McCulloch [1] describe the topology of a Y machine, discussing its advantages of reduced iron in the stator enabling an improvement in torque density. It comprises a series of coils wound around bars spaced circumferentially around the stator, ideally axially disposed, (ie parallel the rotation axis of the rotor). The rotor has two stages comprising discs provided with permanent magnets that face either end of each coil of the stator. The magnetic path at any stage of operation is: through a first coil into a first magnet on a first stage of the rotor; across a back iron of the rotor to an adjacent second magnet on the first stage; through a second coil of the stator adjacent the first coil; into a first magnet on the second stage of the rotor aligned with the second magnet on the first stage; across the back iron of the second stage to a second magnet on the second stage and aligned with the first magnet on the first stage; and completing the circuit through the first coil.

One difficulty with electric machines generally is to provide adequate cooling. This is a particular problem with a Y machine having a high torque density that significant heat is generated in the coils at high torques and is often a limiting factor in the torques that can be employed, at least for extended periods of time.

Another difficulty with electric machines generally is torque ripple caused by cogging. Again, this is a particular problem with a Y machine since the discrete coils do not overlap and indeed rely on magnetic separation, not only between adjacent coils on the stator but also between adjacent magnets on the rotor. Clearly, this problem is reduced to some extent by providing different numbers of permanent magnets on the rotor versus coils on the stator, but since magnets are aligned with one another as the "cog" between adjacent magnets engages with the corresponding "cog" between adjacent coils there is an inevitable torque ripple.

Magnetic connection between the coils and the permanent magnets depends on a strong magnetic field being developed through the coils, either by the magnets in the case of a generator or by the coils themselves in the case of a motor and the permeability of the magnetic circuit should be as low as possible to permit the maximum flux density through the coils. For this purpose a high permeability core or bar is provided around which the coils are wound. However, the bar is preferably laminated or otherwise arranged to reduce the incidence of eddy currents in the bar. Also, the bars are preferably provided with shoes to spread the flux in the air gap and reduce the flux density therein—the air gap is of high reluctance and increasing its area reduces that reluctance, which means that less permanent magnet material can be used. It is desirable to reduce the amount of such material to a minimum.

WO-A-2006/066740 discloses a Y machine comprising a housing having a cylindrical sleeve mounting stator coils internally, the sleeve being hollow whereby cooling medium is circulated. However, the coils are embedded in a thermally conducting material to carry heat to stator housing. A rotor is rotatably journalled in the housing. The stator bars appear to be laminated, as they are in GB-A-2379093 that also discloses a Y machine, as does WO-A-03/094327.

U.S. Pat. No. 6,720,688 discloses a Y machine in which the rotor acts as a vane pump to circulate fluid within a chamber defined by a stator housing through which a rotor shaft, supported on bearings in the housing and carrying the rotor, extends. The fluid cools stator coils. US-A-2005/0035676 discloses another Y machine, particularly adapted for gearless drive of a vehicle wheel.

US-A-2007/0046124 discloses a Y machine in which the rotor has two circumferentially arrayed rows of alternating segments of permanent magnets and ferromagnetic pole pieces.

BRIEF SUMMARY OF THE DISCLOSURE

In accordance with a first aspect of the present invention there is provided an electric machine comprising a rotor having permanent magnets and a stator having coils wound on stator bars for interaction with the magnets across an air gap defined between them, wherein the rotor has two stages arranged one at either end of the bars and wherein the bars have a shoe at each end of each bar that links magnetic flux through the bars with said magnets on each stage, and wherein adjacent shoes facing the same stage of the rotor have a high-reluctance shoe gap between them, and adjacent magnets on each stage of the rotor have a high-reluctance magnet gap between them, wherein the shoe and magnet gaps are angled with respect to each other such that they engage progressively as the rotor rotates, and wherein the shoe on one side of each coil facing a first of said two stages is skewed with respect to the shoe on the other side of the respective coil facing the second of said two stages.

Said shoe gaps between adjacent shoes at either ends of the bars that carry them may cross the magnet gap at the same rotational positions of the rotor with respect to the stator. That is, looking in the axial direction of the machine, the shoe gaps at either end of the bars define an X-shape so that the sector which both of them in combination sweep when crossing the magnet gap is the same as the sector which either one of them alone sweeps. However, it need not be this way, and the shoe gaps could define more of a V-shape where by the sector swept by them both in combination is twice the sector swept by each individually.

In the latter case, although the coil on a given bar and the magnet pair on the rotor stages are aligned, the coil at one end begins to engage the first magnet of the pair before the other magnet. Preferably, the skew is such that there is no alignment in the direction of magnetic flux of the high-reluctance gaps at each end of each bar.

Preferably, when viewed in an axial direction with respect to the axis of rotation of the rotor, said shoes are four-sided, with inner and outer sides being arcs or tangents of circles centred on said rotation axis and said other sides being a leading and trailing edge of the shoe, wherein said leading and trailing edges are chords of one of said circles, each radius of that circle that intersects each chord and that circle making the same angle with the respective chord.

In accordance with a second aspect of the present invention there is provided an axial flux electric machine comprising a rotor and a stator, wherein the rotor has a rotation axis and has permanent magnets spaced circumferentially around said axis on first and second stages of the rotor, and the stator is disposed between said stages and has a plurality of coils disposed around said axis and each coil being wound on a stator bar for magnetic interaction with the magnets across an air gap defined between the rotor and stator, wherein each bar has a shoe at each end of the bar that links magnetic flux through the bar with said magnets on each stage, and wherein the shoes facing each stage are in a ring of connected shoes such that the magnets experience a continuous reluctance that is at least 90% constant as a function of rotor position.

90% is a somewhat arbitrary limit to indicate that there may well still be some residual reluctance variation, but it is minor. Preferably, said rings of connected shoes are on two integral annular components, one including some or all of the bars of the stator, some or all of parts of them, and the other including any remaining bars of the stator, or parts of them, said coils being disposed on the bars before the annular components are connected together to complete construction of said stator.

Said annular components may, indeed, preferably are, pressed in a mould from soft-iron particles to form a soft iron composite. Alternatively, each said annular component may be formed from a lamination ring from which slots defining said bars have been cut. The winding of the lamination ring is around the rotation axis of the rotor, of course.

In any event, preferably, the annular components are identical. They may comprise interfaces adapted to facilitate connection of said annular components. Said interfaces may comprise a stud and socket, wherein the stud on each bar of one component engages the socket of a facing bar on the other component. Thus where the annular components are identical, they may be mated to connect them together and the interfaces are arranged so that this can be done.

Preferably, high reluctance gaps are provided between each shoe of each component, said gap comprising a thinning of the connection between each shoe. These gaps prevent magnetic short-circuiting of the coils, although they have a corollary effect of undermining to a small extent the smooth, cogless operation, and a compromise is necessary.

In accordance with a third aspect of the present invention there is provided an electric machine comprising a rotor having permanent magnets and a stator having coils wound on stator bars for interaction with the magnets across an air gap defined between them, wherein the bars have shoes that link magnetic flux through the bars with said magnets, and wherein the bars and shoes are formed separately from one another and at least a part of each is formed by moulding soft-iron particles so that the particles have a short dimension that is arranged transverse a reluctance-plane, and the bars and shoes are assembled so that said reluctance-plane of the bar is parallel a longitudinal axis of the bar and said reluctance-plane of the shoe is transverse said longitudinal axis.

The alignment of the short dimension of the particles transverse said reluctance-planes results in each reluctance-plane having a minimum reluctance. Preferably, said particles of at least the bars have a single longitudinal dimension and said particles are also aligned so that their longitudinal dimension is parallel a reluctance-direction in said reluctance-plane, said reluctance-direction of the bars being parallel said longitudinal axis of the bar. If the particles of the shoes have a single longitudinal dimension, preferably said reluctance-direction is radial with respect to said longitudinal axis when the bars and shoes are assembled.

Said moulding of said soft-iron particles may be by pressing round soft iron particles in a direction transverse to said reluctance-plane whereby the particles are flattened to produce said short dimension. Alternatively, said moulding may be of already flattened particles, or of elongate particles. Elongate particles may be aligned prior to moulding by use of a magnetic field. Moulding includes shaping.

Preferably, the rotor has two stages arranged one at either end of the bars and shoes are provided at each end of each bar. Preferably, the electric machine is an axial flux machine and the bars are arranged parallel the rotor rotation axis.

The bars may include a rolled sheet of ferromagnetic material whose axis of roll is arranged parallel said longitudinal axis. The sheet itself is preferably rolled in production in a direction parallel their roll in the bars, whereby the grains of the material are themselves oriented in the eventual direction of flux, ie parallel said longitudinal axis. Said roll may be disposed around a shaped soft-iron pressed-particle core, whereby the cross section of the bar perpendicular said longitudinal axis is substantially trapezoidal. Alternatively, said roll may be the core of a shaped annulus of pressed soft-iron particles, whereby the cross section of the bar perpendicular said longitudinal axis is substantially trapezoidal.

In accordance with a fourth aspect of the present invention there is provided an axial flux electric machine comprising a rotor and a stator, wherein the rotor has a rotation axis and has permanent magnets spaced circumferentially around said axis on first and second stages of the rotor, and the stator is disposed between said stages and has a plurality of coils disposed around said axis and each coil being wound on a stator bar for magnetic interaction with the magnets across an air gap defined between the rotor and stator, wherein each rotor stage comprises a non-ferromagnetic carrier on which is disposed an annulus of permanent magnets having their magnetic polarities substantially parallel said rotation axis and alternating between adjacent magnets, adjacent magnets being linked by a ferromagnetic connecting piece disposed on back-sides of the magnets remote from the stator, each connecting piece having a relatively low magnetic capacity where it connects with a middle region of said back-side of each magnet and a relatively high magnetic capacity where it connects between adjacent magnets.

Preferably, said connecting pieces have side edges that are radial, a plane face between said edges that abut said magnets and flanks that rise from said edges away from said plane face to a central ridge. Said ridge may be flat and triangular or trapezoidal and abuts said non-ferromagnetic carrier. Said connecting pieces may be truncated sectors of a circle in axial view. Bolts may connect the magnets through said connecting piece to said carrier.

In accordance with a fifth aspect of the present invention there is provided an axial flux electric machine comprising a rotor and a stator, wherein the rotor has a rotation axis and has permanent magnets spaced circumferentially around said axis on first and second stages of the rotor, and the stator is disposed between said stages and has a plurality of coils disposed around said axis and each coil being wound on a stator bar for magnetic interaction with the magnets across an air gap defined between the rotor and stator, wherein each rotor stage comprises a non-ferromagnetic carrier on which is disposed an annulus of permanent magnets having their magnetic polarities arranged substantially circumferential with respect to said rotation axis and alternating between adjacent magnets, adjacent magnets being separated by ferromagnetic connecting pieces, whereby said connecting pieces define alternating magnetic poles with respect to the stator coils.

Said connecting pieces are made by pressing soft magnetic composite material into the desired shape.

In an embodiment an electric machine comprises a rotor having permanent magnets and a stator having coils wound on stator bars for interaction with the magnets across an air gap defined between them, wherein the bars and coils thereon are enclosed by a stator housing that extends between the air gap and defines a chamber incorporating cooling medium to cool the coils.

Preferably, the electric machine is an axial flux machine, said bars being disposed circumferentially spaced around a rotational axis of the rotor and, preferably, parallel thereto, the rotor comprising two stages each having permanent magnets interacting with each end of the bars.

Said stator housing may comprise two annular plates and two cylindrical walls, the annular plates including recesses to locate the bars within the chamber.

Preferably, the material of the stator housing is non-magnetic and non-conducting. However, in the case of separate annular plates and cylindrical walls, said cylindrical walls are preferably aluminium and said annular plates are plastics material. Alternatively, said annular plates may be integral with said cylindrical walls, which cylindrical walls are in this case split around their circumference and connected together along inner and outer circumferential seams. The split may be central defining two clamshells. The clamshells may be substantially identical, possibly being "mirror" images so that they fit one another, facilitating seam welding around the joins at the splits. In this case, the clamshells may be plastics mouldings.

Preferably, said annular plates are thinned at the ends of the bar to minimize the gap between the bars and the magnets on the rotor. Preferably, said cylindrical walls are an inner and outer wall, said outer wall having means to mount the machine and said inner walls comprising means to mount bearings for the rotor.

Preferably, the rotor stages each comprise an annular dish, whose outer rims mount said permanent magnets and whose inner rims are connected together enclosing said bearings. The rotor stages are dish-shaped to increase their rigidity in a radial plane (ie a plane perpendicular to the rotation axis of the rotor and also, preferably, perpendicular to the stator bars).

Preferably, the stator housing insulates the magnets from heat generated in said coils. Preferably, said stator housing includes ports for supply and drainage of said cooling medium. The cooling fluid may be pumped through the machine through an inlet near the bottom of the machine, and out of an outlet near the top. Fluid may flow around the outer and inner radii of the coils, some fluid also flowing between the coils. Preferably, the cooling fluid flows back and forth between the outer and inner radius on plural occasions by reason of blocks disposed between the coils and the stator housings, whereby the fluid is forced in between the coils. There may be between two and eight transitions of the fluid flow between the coils. The cooling flow may alternatively be split, with some flowing around the inner diameter of the coils from the inlet, and the rest flowing at the outer diameter in the opposite direction, some fluid flowing also between the coils. Preferably, the chamber is lined with a lacquer or resin coating that insulates electrically the chamber and its contents from direct contact with the cooling medium.

Indeed, the present invention provides a method of constructing an electric machine as defined above comprising the steps of: assembling the machine; filling the chamber with liquid resin or lacquer to wet all the internal surfaces of the chamber including its contents; removing the resin to leave a coating of the resin on the internal surfaces of the chamber; and curing the resin to form an electrically insulating layer on said internal surfaces.

In accordance with other aspects of the present invention, there is provided electric machines that incorporate some or all of the foregoing aspects (where they are not mutually exclusive), such combinations being evident to the skilled person. Whereas the following description of specific embodiments may include or exclude different aspects mentioned above, this is not to be understood as being significant.

BRIEF DESCRIPTION OF THE DRAWINGS

Embodiments of the invention are further described hereinafter with reference to the accompanying drawings, in which:

FIG. 1 is a schematic side view of a yokeless and segmented armature machine to which the present invention primarily (but not exclusively) relates;

FIG. 2 is a perspective view of the arrangements of FIG. 1;

FIG. 3 is a perspective exploded view of a stator housing and stator of a machine in accordance with an aspect of the present invention;

FIG. 4 is a perspective exploded view of a stator in accordance with an aspect of the present invention;

FIGS. 5a, b and c are respectively an end view, a section on the line B-B in FIG. 5a and a perspective view of a stator in accordance with an aspect of the present invention;

FIGS. 12 and 13 are respectively a side and an end view in the direction of the Arrows XII and XIII respectively in FIG. 9;

DETAILED DESCRIPTION

Figure 6D:
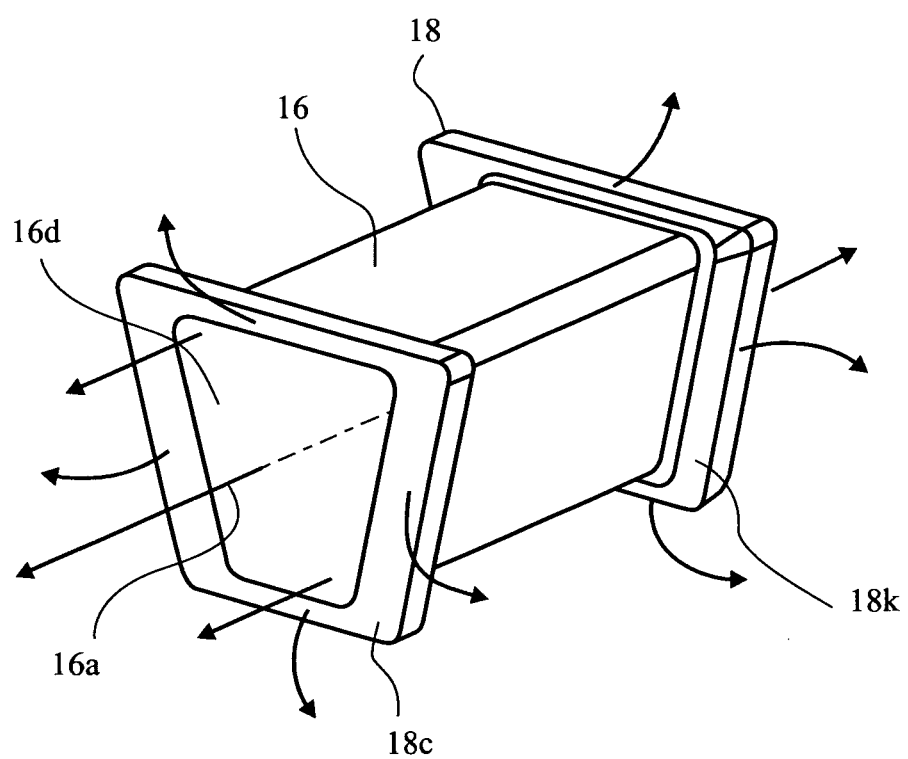
FIGS. 6a, b c and d are respectively an exploded perspective view of a stator bar and shoes in accordance with an aspect of the present invention, an end view of another embodiment of bar, an end view of a further embodiment of bar, in accordance with this aspect of the invention, and a perspective view of a composite stator bar and resultant flux paths.
Figure 7:
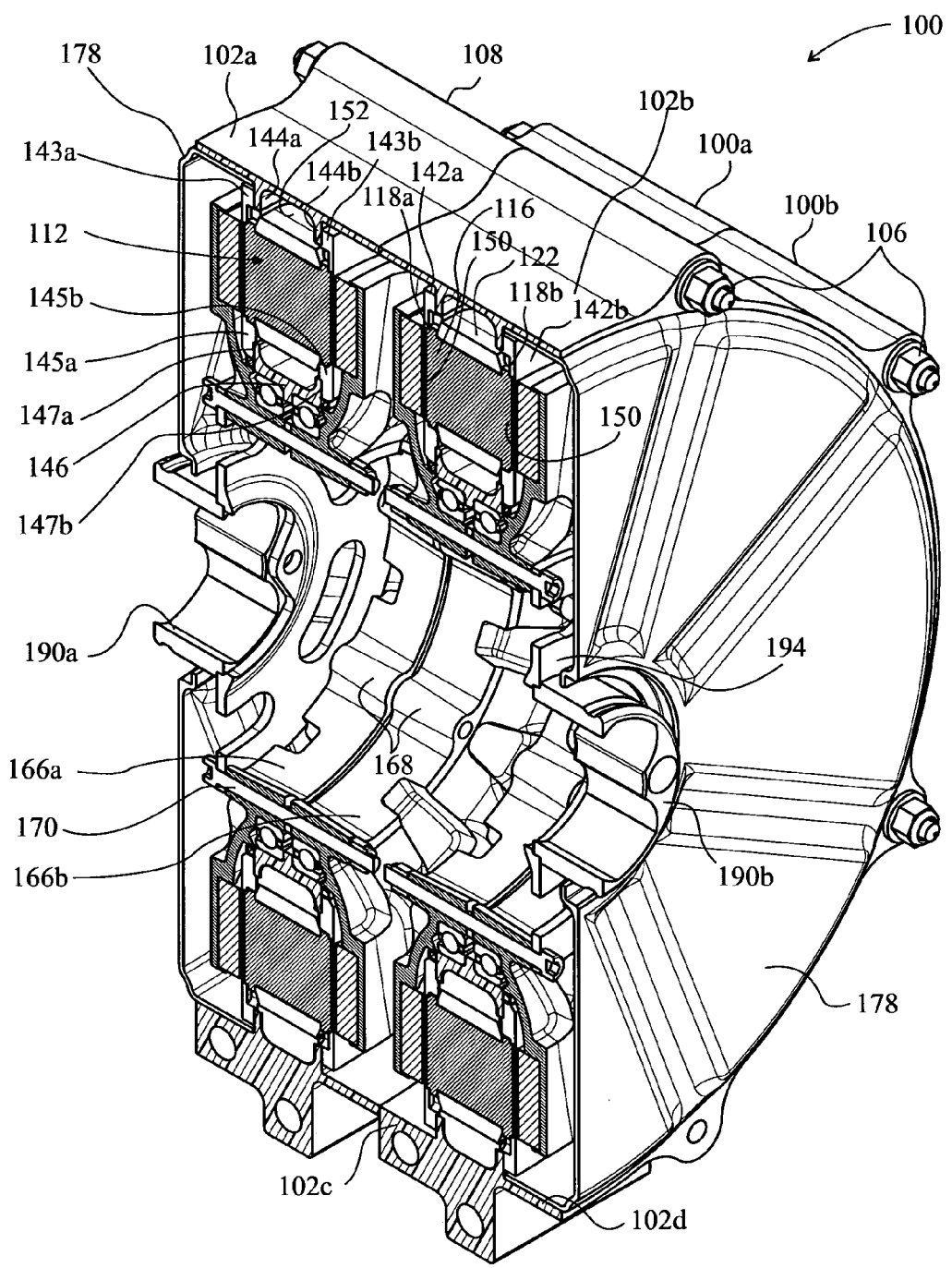
FIGS. 7, 8 and 9 are respectively a cut perspective view, a slice and a section (both of the latter views being in the cut plane of FIG. 7) of an electric machine in accordance with an aspect of the present invention.

A yokeless and segmented armature machine 10 is illustrated schematically in FIG. 1. The machine 10 comprises a stator 12 and two rotors 14a, b. The stator 12 is a collection of separate stator bars 16 spaced circumferentially about a rotation axis 20 of the rotors 14a, b. Each bar 16 has its own axis 16a which is disposed parallel to the rotation axis 20. However, that is not absolutely essential. In an axial flux machine, the axis 16a is indeed parallel the rotation axis 20. However, it can be disposed at any angle thereto, even radially with respect to the rotation axis 20. The following discussion is in respect of an axial flux machine, but this should not be understood to be limiting in any sense and, where the context permits, the invention equally applies to other inclinations of the stator bars 16.

Each end of each stator bar is provided with a shoe 18a, b which serves a physical purpose of confining a coil stack 22, which stack 22 is preferably of square section insulated wire (or possibly rectangular section) so that a high fill factor can be achieved. The coils 22 are connected to an electrical circuit (not shown) that (in the case of a motor) energizes the coils so that the poles of the resultant magnetic fields generated by the current flowing in the coils is opposite in adjacent stator coils 22.

The two rotors 14a, b carry permanent magnets 24a, b that face one another with the stator coil 22 between. Indeed, in the axial flux machine, the rotors and their magnets are radially disposed, but when the stator bars are inclined, then they are likewise. Two air gaps 26a, b are disposed between respective shoe and magnet pairs 18a/24a, 18b/24b. There are an even number of coils and magnets spaced around the axis of rotation 20 and, preferably, there are a different number of coils and magnets so that each coil does not come into registration with a corresponding magnet pair all at the same time and at the same rotational position of the rotor with respect to the stator. This serves to reduce cogging.

In a motor (with which the present invention is primarily concerned) the above-mentioned electric circuit is arranged to energize the coils 22 so that their polarity alternates serving to cause coils at different times to align with different magnet pairs, resulting in torque being applied between the rotor and the stator. The rotors 14a, b are generally connected together (for example by a shaft, not shown) and rotate together about the axis 20 relative to the stator 12, which is generally fixed (for example in a housing, not shown). One advantage provided by the arrangement is illustrated in FIG. 1 in that the magnetic circuit 30 is provided by two adjacent stator bars 16 and two magnet pairs 24a, b. Thus, no yolk is required for the stator 12, although a back iron 32a, b is required for each rotor linking the flux between the back of each magnet 24a, b facing away from the respective coils 22.

Thus, in the case of a motor, by appropriate energization of the coils 22, the rotor 14 can be urged to rotate about the axis 20. Of course, in the situation of a generator, rotation of the rotor 14a, b induces currents in the stator coils 12 according to the changing magnetic flux induced in the stator bars 16 as the rotors 14a, b rotate.

However, in either case heat is generated in the coils 22 and the efficiency of the machine is reduced, and its capacity limited, if this heat is not removed. Accordingly, the present invention suggests enclosing the stator coils 16 within a housing that extends through the air gap 26a, b and which is supplied with a cooling medium.

Turning to FIG. 3, a stator 12a in accordance with a first aspect of the present invention is shown in which the stator coils are located between plastics material clam shells 42a, b. These clamshells have external cylindrical walls 44, internal cylindrical walls 46, and annular radially disposed walls 48. The annular walls 48 include internal pockets 50 to receive the shoes 18a, b of the stator bars 16 and serve to locate the stator coil assemblies 16, 22, 18a, b when the two clam shell housings 42a, b of the stator 12a are assembled together. The stator housing 42a, b defines spaces 52 internally of the coils 22 and also externally at 54 around the outside of the coils 22. Furthermore, there are spaces 56 between the coils. Although not shown in FIG. 3, when assembled, the stator housing 42a, b is provided with ports that allow cooling medium (preferably electrically non-conducting liquid) to be pumped into the spaces 52, 54, 56 to circulate around the coils and cool them. Indeed, being made, preferably, from a plastics material such as [polycarbonate] or other low heat-conducting material, heat generated by the coils and conducted into the shoes 18a, b is retained within the housing and not transmitted to the magnets 24a, b, which are particularly susceptible to heat. Choice of the material employed for the clamshells 42a, b is to some extent dependent on the design working temperature and, if this is low, many materials are suitable, but, if it is high, then heat resistant material such as glass fiber reinforced plastics material would be desirable. Further reference to the cooling arrangements of the present invention are also described below with reference to FIGS. 7 to 13.

A preferred arrangement involves construction of the machine as described above and then, when complete, filling the spaces 52,54,56 with a sellable liquid resin or lacquer that wets all the internal surfaces of those spaces, including the coils 22. Once the resin has had the opportunity to penetrate every space it is drained from the machine leaving only a surface coating of the resin inside the chamber defined by the spaces 52,54,56. Prior to draining, the chamber may be evacuated in order to commit the liquid lacquer to penetrate small spaces, especially between the wires of the coils 22. When the vacuum is removed, resumption of atmospheric pressure drives the lacquer into any remaining unoccupied spaces. Indeed, the lacquer is preferably of low viscosity so that it penetrates small spaces easily. After draining, the resin cures (or is cured) to form an electrically insulating layer that separates the spaces 52,54,56 from coils 22. By this means, water can be employed as the cooling medium. Suitable lacquers are within the knowledge of a person skilled in the art.

Referring again to FIGS. 1 and 2, even without identical numbers of magnets 24a, b and coils 22, an inherent problem of the arrangement is the cogging effect that occurs as the high-reluctance gaps 25 between adjacent magnets pass over the corresponding gaps 27 between stator coil shoes 18a, b.

It is well known that coil cores for electric machines are frequently made from steel laminations. Steel is an excellent conductor of a magnetic field. It provides a low reluctance path therefore and has low hysteresis loss. However, a problem with ferromagnetic materials is that they are generally also electrical conductors. Therefore, the changing flux through an electrical conductor creates eddy currents. These are minimized by employing laminations that are separated by an insulator, with the insulation being parallel to the desired flux direction so that transverse electrical currents are minimized. However, a new technique is meeting with some success employing soft-iron particles coated with insulation and moulded to a desired shape (soft magnetic composites-SMC), being bound together by the resinous insulation. A high-pressure compaction process is used to mould the component into a complex shape, capable of producing three-dimensional magnetic flux patterns with an excellent form factor and enabling a high fill factor winding to be employed, wound straight onto SMC teeth.

Turning to FIG. 4, a stator 12b in accordance with a second aspect of the present invention is shown. This is a particularly suitable arrangement of the stator in a low cost arrangement. It has integral stator bars 16' formed from two, preferably identical, components 75a, b. Each component is an annulus 76 with upstanding bar-parts 78. The bar-parts may have alternating studs 80 and pockets 82 on facing interfaces 81, so that, when oriented to face one another, two identical components 75a, b can be mated together, with the studs 80 entering the pockets 82 of the other component. The two components can be glued together. However, prior to assembly, pre-wound coils 22 (shown schematically in FIG. 4 as solid rings) are located on the bar parts 78 of one component 75a, b so that, when connected together, the components 75a, b and the coils 22 complete an assembly of the magnetic parts of the stator 12b.

The advantage of the arrangement shown in FIG. 4 is that the magnets facing the annulus 76 on each side of the stator are never presented with an air gap between adjacent stator coils 22. Accordingly, the inherent problem of cogging mentioned above can be eliminated, or at least reduced—the magnets see a continuous reluctance, which can be almost constant as a function of rotor position. However, magnetic connection between adjacent coils is to be discouraged, since that short circuits the flux path and reduces the efficiency of the motor. Accordingly, the annulus 76 is thinned at 84 between each bar part 78 so that the opportunity for magnetic shorting is reduced. However, by providing a high reluctance gap 84 between each stator coil this mitigates the anti-cogging effect of the complete metal face 76. Accordingly, there is a balance to be made between smooth running of the motor and its efficiency. Nevertheless, there is an optimum position at which cogging is minimized to a substantial degree without significant impairment of motor efficiency. An advantage of the present embodiment is its potential low cost of manufacture.

The components 75a, b are advantageously constructed from SMC material, each pressed in a single mould. However, the simplicity of their shape also permits them to be manufactured from a single annulus of wound laminations (having an axis of winding on the rotation axis 20), with slots 83 between adjacent bar parts 78 being cut out with a wire cutter. Finally, the advantage of the present invention could be achieved by employing the arrangements described above with reference to FIGS. 2 and 3 but where the shoes 18 and bars 16 are not constructed in a single annulus but each independently. In this event, the shoes are sized so that they contact one another when arranged in the motor and thereby reduce cogging.

In FIGS. 5a and b, an alternative arrangement of the stator 12c is shown that also reduces cogging, but without affecting the efficiency of the machine. Here, each stator bar 16 is provided with its own shoe 18 so that there is a resultant air gap 27a between them. Normally, this would result in the cogging effect mentioned above. However, here, the air gap 27a is skewed relative to the radial direction by an angle $\alpha_1$, at least one side 18j of the shoe is skewed at this angle, the radius in question passing through the bottom corner 18g of the shoe. The other side 18h of the shoe is skewed at an angle $\alpha_2$ that differ from $\alpha_1$, by a quantity dependent on the width of the air gap 27a. Be that as it may, the average value of $\alpha_1$ and $\alpha_2$, is between 1° and 45°, conveniently about 10° with the number of pole pieces shown. The angle is selected to minimize the cogging torque that the skilled person will be able to determine without undue burden for any particular machine. The stator bar 16 is trapezium shaped, as in the embodiments described above, with rounded corners and the coils 22 are likewise trapezium shaped around the cores formed by the bars 16. They are symmetrically disposed with respect to the rotation axis 20. This means that at opposite corners 18d, f the coil 22 extends beyond the extremity of the shoe 18. However, at least at the outer edge 18e, the shoe overlaps to a small extent the coil 22 of the adjacent shoe. The trailing corner 18g at least overlaps the coil 22 of its own stator bar 16.

To the right of FIG. 5 is shown, in dotted line, the air gap 27'a that is on the opposite side of the stator 12c, the bottom corner 18'g of its shoe being fully visible. It can be seen, therefore, that the two air gaps 27a, 27'a overlap in an axial direction only in a small diamond shaped region 27b. Assuming that the high reluctance gaps 25 between the magnets on the rotors are radial, then the effect of skewing the shoes is that the transition from one magnet to another from the perspective of a particular stator coil is spread over a wider arc of rotation of the rotor with respect to the stator than if the gaps are both radial.

Of course, it is equally feasible to skew the magnet gaps 25 and the same effect can be achieved. That is to say, the shoe gaps 27 could be radial, as they are in the embodiments described above with reference to FIGS. 1 to 3, with the magnet gaps inclined oppositely with respect to each rotor 14a, b. However, arranging for magnets to be provided in such special shapes is costly and is not within the ambit of the present invention. The stator shoes are preferably a pressed part that is easily shaped, and they may be designed as a single part that is simply turned at each end of the stator coil bars to provide oppositely directed skews. Nevertheless, a combination of skews of both the stator shoes and rotor magnets could be arranged. In any event, it is desirable that the arc of transition, shown as the angle $\beta$ (being the angle subtended between the circumferential limits of the two shoe gaps 27a, 27'a), is equal to about half the sum of $\alpha_1$ and $\alpha_2$. Of course, there is a balance to be struck, because the transition from one magnet to another represents a region a torque reduction and therefore spreading this has the corollary effect of concentrating the torque between the transitions.

It is also to be noted that the shoes 18 are chamfered outwardly at 18k around the entire periphery of the shoe. This assists in focusing the flux out of the plain of the shoes 18 towards the magnets 24a, b.

Indeed, in an aspect of the present invention, the problem of minimizing the reluctance of the material of the stator bar and shoe in the direction of the magnetic flux is addressed in the arrangement of FIGS. 6a to d. Thus while SMC material is very suitable, as discussed above with reference to FIG. 4, it should be noted that, while coated soft-iron particles have the capacity to reduce eddy currents and generally to have a low magnetic reluctance in all directions, they do not have the best, that is to say, the minimum reluctance possible, which is still in the domain of laminations, at least in the plane or direction of the laminations.

In this aspect, the present invention suggests employing such particles in the construction of the stator bar 16 and shoes 18, but arranging them so that they have a preferential direction, or at least plane, of low reluctance, which is preferably lower than normally provided by such particles. In the case of the bar 16, this preferential direction is in planes parallel to the axis 16a. In the case of the shoes 18, a minimum reluctance is desirably arranged in planes perpendicular to the longitudinal axis 16a. This can be provided in several ways, although fundamental is the separate construction of the bar 16 and shoes 18, as shown in FIG. 6a, and their subsequent assembly.

Thus, the bar 16 of FIG. 6a is manufactured from round, insulation-coated, soft-iron particles. These particles are first flattened into disc-like components, before being placed into a mould and finally pressed together. The mould is arranged so that the direction of pressing of the particles, and their initial distribution prior to pressing, is such that the major dimensions of the particles lie in a plane that is parallel to the axis 16a. This might most conveniently be achieved, albeit only partially, by commencing with essentially round particles in the mould and pressing them together in a direction perpendicular to the axis 16a. For example, pressing upwardly in the direction of the Arrow A not only flattens the particles in a plane orthogonal to the direction A, but also tends to spread them in the direction of the Arrows B.

Ideally, however, the particles are elongate and are arranged in the mould with their long axis parallel to the axis 16*a*. This can be achieved by employing a magnetic field to align the particles. In that event, the line of minimum flux for the component is not just in planes parallel to the axis 16*a*, but actually in that specific direction.

On the other hand, the shoes 18 are preferably manufactured by pressing round particles in a direction parallel to the axis 16*a* so that, during the compaction process, they spread laterally in the plane perpendicular to the axis 16*a*. When the shoes 18 and bar 16 are assembled together, the magnetic flux can therefore travel with minimum reluctance through the bar 16 in the direction of the longitudinal axis 16*a* and exit the bars 16 both in the direction of the axis 16 from the end 16*d* of the bars to enter directly the air gaps 26*a, b*, but also orthogonally into the shoe peripheries 18*c*, as can be seen from the magnetic flux arrows indicated in FIG. 6*d*.

In a preferred arrangement, the stator bars 16 also comprise a lamination roll, which can improve the directional bias of minimum reluctance. Thus, in FIG. 6*b*, a roll 90 of insulation-coated steel is arranged in a mould (not shown) with its axis parallel the (ultimate) axis 16*a* of the bar 16*b* to be formed. The mould is then filled with particles that are pressed and compacted around the lamination roll so that a plane of minimum reluctance of the particles is parallel the axis 16*a*. They surround the roll 90 and give the bar its desired trapezium-shaped section.

An alternative construction is to form a trapezium-shaped core 92 of pressed soft-iron particles having at least a plane of minimum reluctance parallel the axis 16*a*. A lamination roll 94 is then wound around the core 92 and results in a stator bar 16*c* having the desired external sectional shape.

Both the bars 16*b, c* of FIGS. 6*b* and *c* each have preferential directions of minimum reluctance parallel to the axis 16*a*. Collars 18*c*, formed from pressed, soft iron particles, have minimum reluctance planes perpendicular to the axis 16*a*. When assembled, the bar and collars result in a stator core that has an extremely low-reluctance and is directionally optimized.

The invention is further described with reference to FIGS. 7 to 13 illustrating a particular construction of motor 100. Again, while a motor is described, it should be understood that the principles also apply directly to a generator. The motor 100 is, in fact, two motor slices 100*a, b* bolted together. Each motor slice 100*a, b* has a tubular housing 102*a, b* having radially planar end faces 104*a, b* whereby several housings 102 can be bolted together end to end by bolts and nuts 106 passing through bosses 108 arranged around the housings 102*a, b*. Indeed, the motor 100 can be mounted in a vehicle, for instance, using the bosses 108 as mounting flanges. Despite being bolted together and being a composite motor 100, each motor slice 100*a, b* is independent of one another, as described further below, and can be driven at its own speed and torque, as required by a motor management system, which is not described further herein. However, as also explained further below, the motor slices 102*a, b* could be connected to a single output drive, thereby doubling the output torque available. Indeed, there is no limit to the number of motor slices that can be stacked together.

Figure 10:
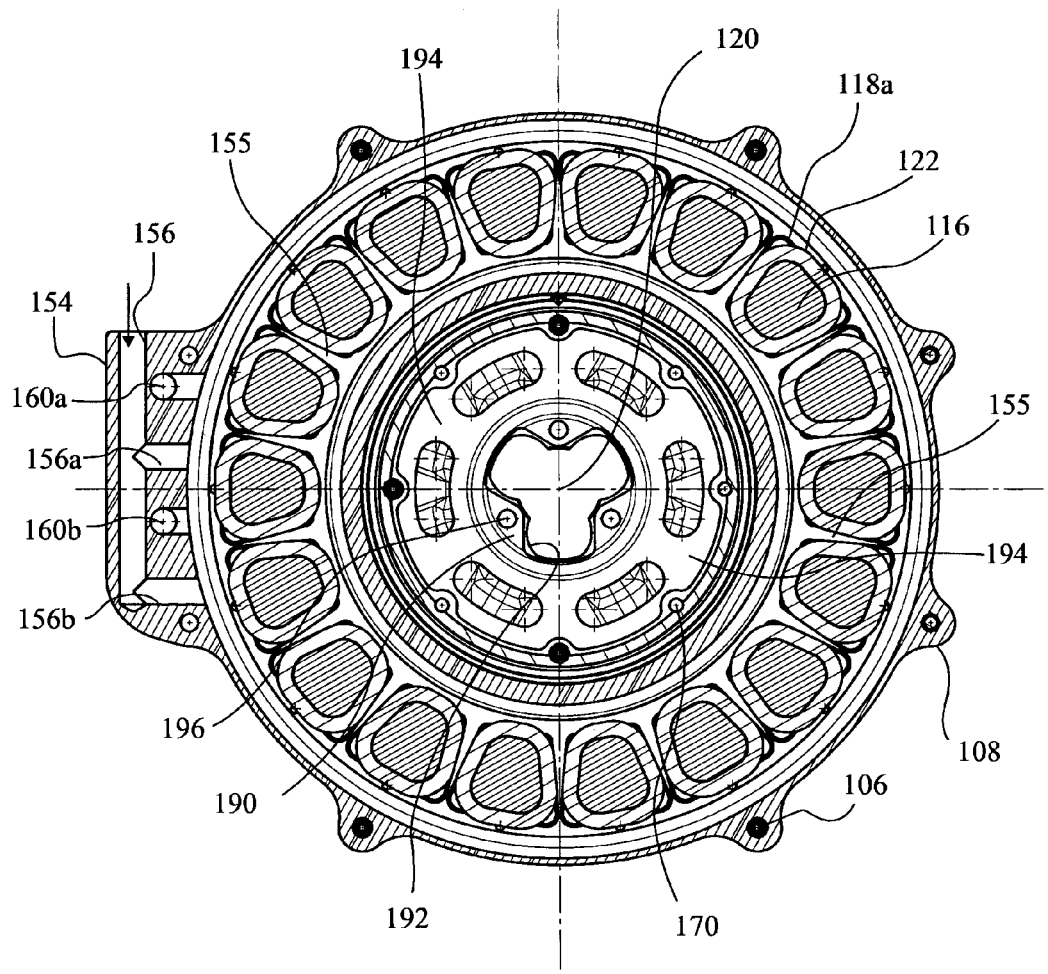
FIGS. 10 and 11a are respectively a section and a slice on the lines 10-10 and 11-11 respectively in FIG. 9.

Thus, each motor slice 100*a, b* has a stator 112 having a plurality of stator coils 122 mounted on stator bars 116 having shoes 118*a, b*. The coils 122 are spaced circumferentially around the rotor axis 120, as shown in FIG. 10 and there are 18 of them in the motor of FIG. 10. Each stator coil shoe 118*a, b* is received in a pocket 150 of an annular non-electrically conducting, non-magnetic clamshell 142*a, b*. The clamshells are fixed around their outer periphery 143*a, b* to internal flanges 144*a, b* of the motor housings 102*a, b*.

The internal edges 145*a, b* of the annular clam shells 142*a, b* are mounted on flanges 147*a, b* of an essentially tubular inner stator housing 146. It is to be noted that the inner stator housing component 146, together with the clamshells 142*a, b* and the motor housing 102 complete an annular chamber 152 in which the stator coils are disposed.

Figure 11A:
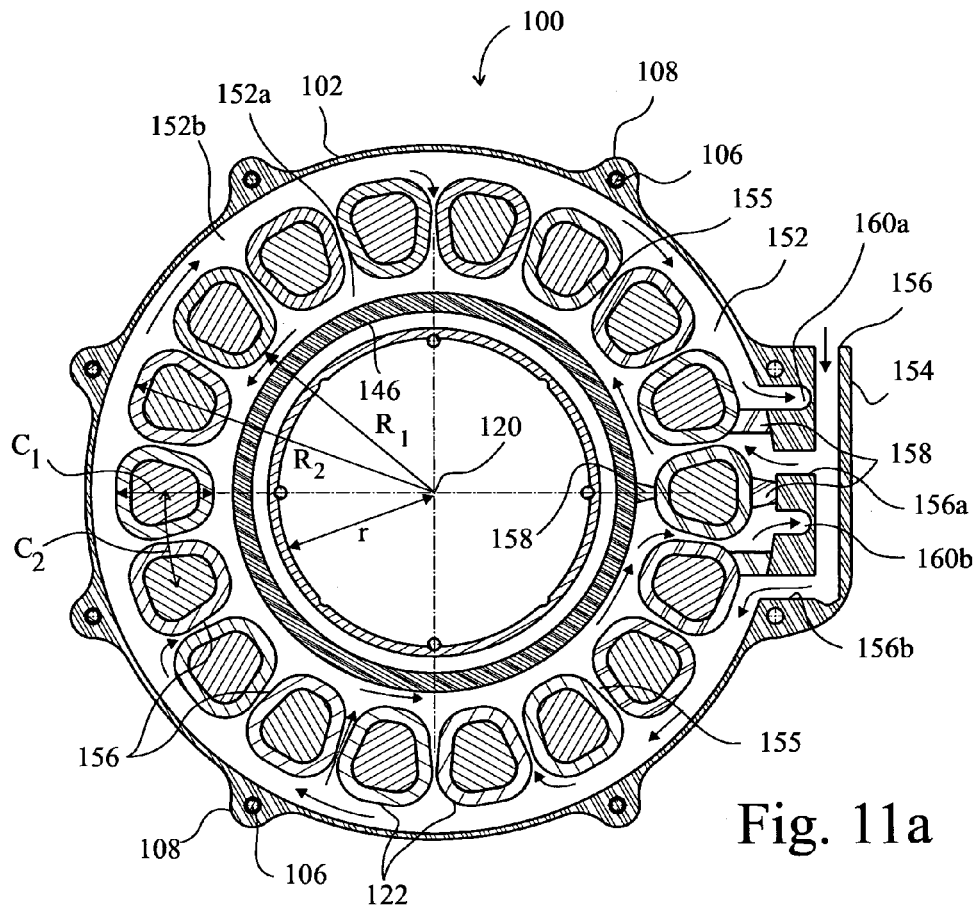
Figure 11B:
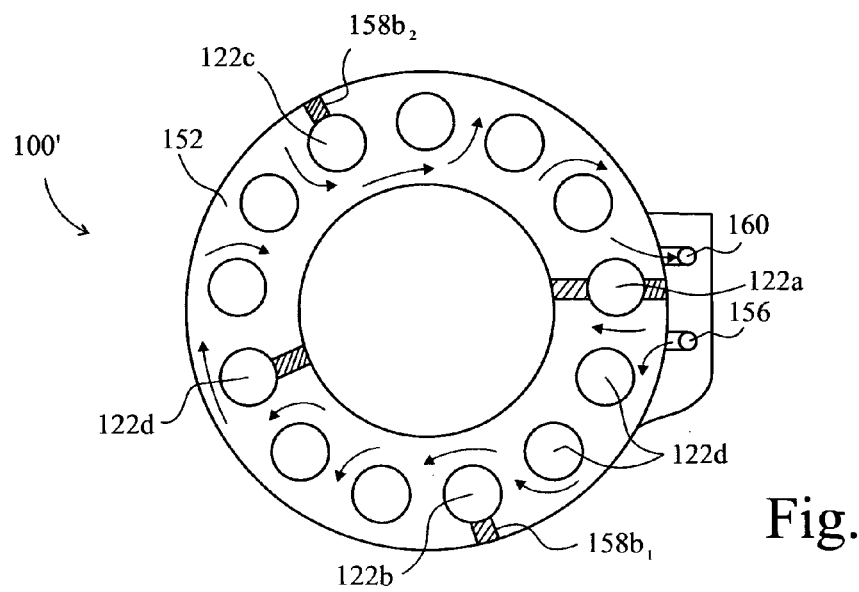
FIG. 11b is a schematic illustration corresponding to FIG. 11a, but with a different coolant flow arrangement.

Turning to FIG. 11, the motor housing 102 is provided with a port boss 154, provided with an inlet 156 for cooling medium. Inside the chamber 152 barriers 158 are disposed between the first coils and the housings 102,146 to divide the chamber 152 into two parallel annular passages 152*a, b*. Each is supplied with their own respective branch 156*a, b* of the inlet port 156. The parallel passages 152*a, b* are separated by the coils 122, between which there are gaps 155. Thus, cooling medium circulating in the passages 152*a, b* can cross and circulate around the entire periphery of the coils 122. After completing a circuit around the motor (in a contra flow direction, it is to be noted, that will encourage turbulence through and between the gaps 155) the cooling medium exits the port boss 154 by outlets 160*a, b*. They join at port 160 (see FIG. 9) and return the cooling medium to a pump and heat exchanger (neither shown) from whence it came. Alternative approaches are quite feasible:

1) The cooling fluid is pumped straight through the machine, with the inlet near the bottom of the machine, and the outlet near the top. The fluid may flow around the outer and inner radii of the coils, some fluid also flowing between the coils. This is the most simple cooling path to implement, but probably the least effective;

2) The cooling fluid is forced to zig-zag around the motor, moving between the outer and inner radius on 2-8 occasions (by blocks disposed between the coils and the stator housings 102,146) so that the fluid is forced in between the coils, which is generally the hottest part of the machine;

3) The cooling flow is split (as described above), with some flowing around the inner diameter of the coils, and the rest flowing at the outer diameter in the opposite direction. Some fluid flow will also occur between the coils; and 4) In a particularly preferred arrangement, the cooling flow is as illustrated in FIG. 11*b* in which one inlet 156' and one outlet 160' is provided, with blocks 158*a* on either side of coil 122*a* between the inlet and outlet. Blocks 158*b* are periodically disposed around the machine firstly (158*b*1) and lastly (158*b*2) on the outside of coils 122 *b, c* and between at least one block 158*c* on the inside of coil 122*d*. By this arrangement the flow enters the inlet 156 and begins around the outside of the machine, but is directed by the first block 158*b*1 to transition to the inside of the chamber 152, between different ones of intervening coils 122*d*. From there, flow continues circulation around the machine but is forced by block 158*c* to transition back to the outside of the chamber. Further around the machine, block 158*b*2 obliges transition back to the inside and, finally, in order to exit the machine through outlet 160, blocks 158*a* force transition a final time back to the outside. In FIG. 11*b*, there are four transitions. However, any even number of transitions is possible, or even an odd number if the inlet and outlet are arranged one on the outside of the machine (as shown) and the other on the inside (not shown).

Figure 8:
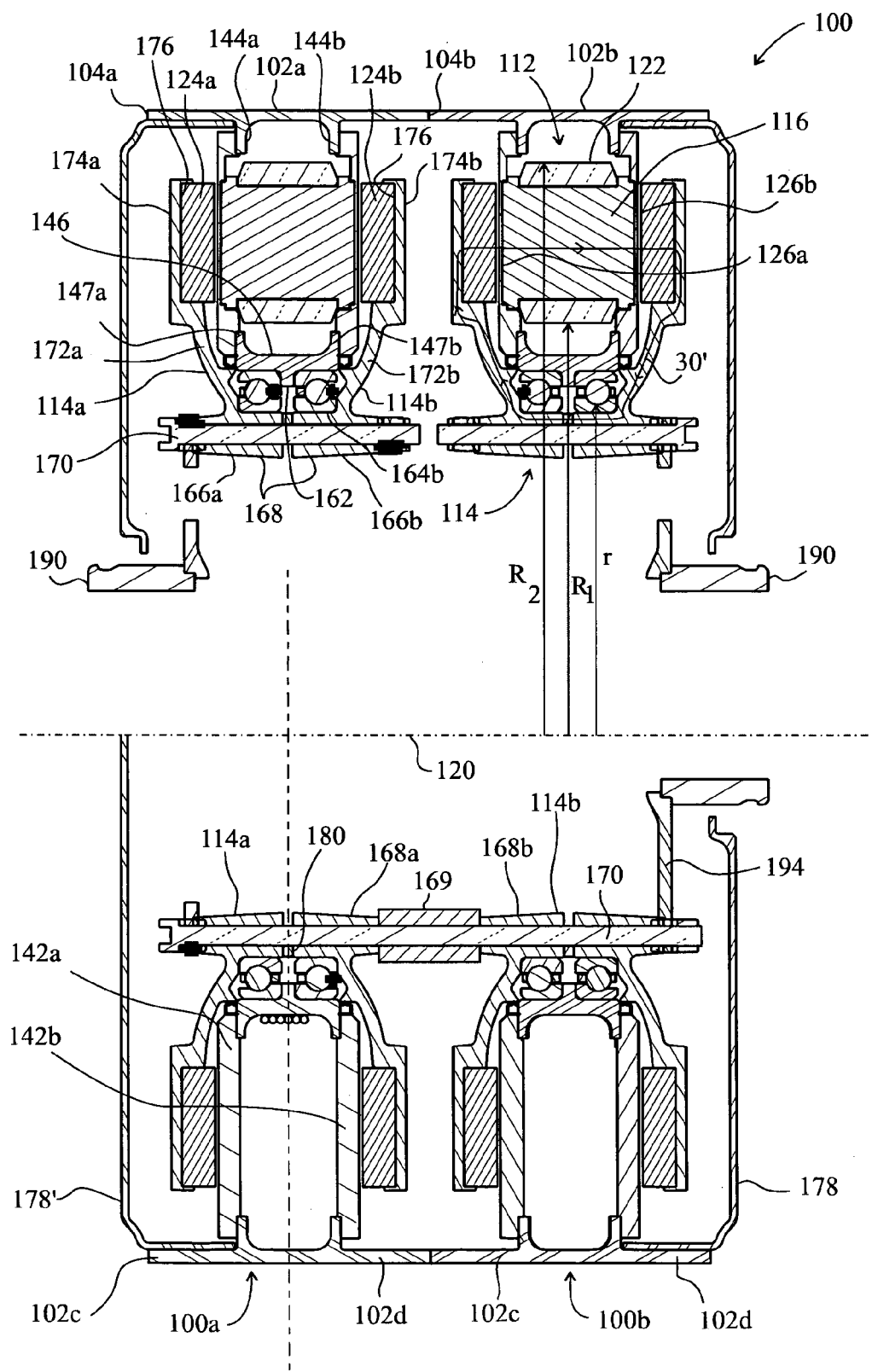
Figure 9:
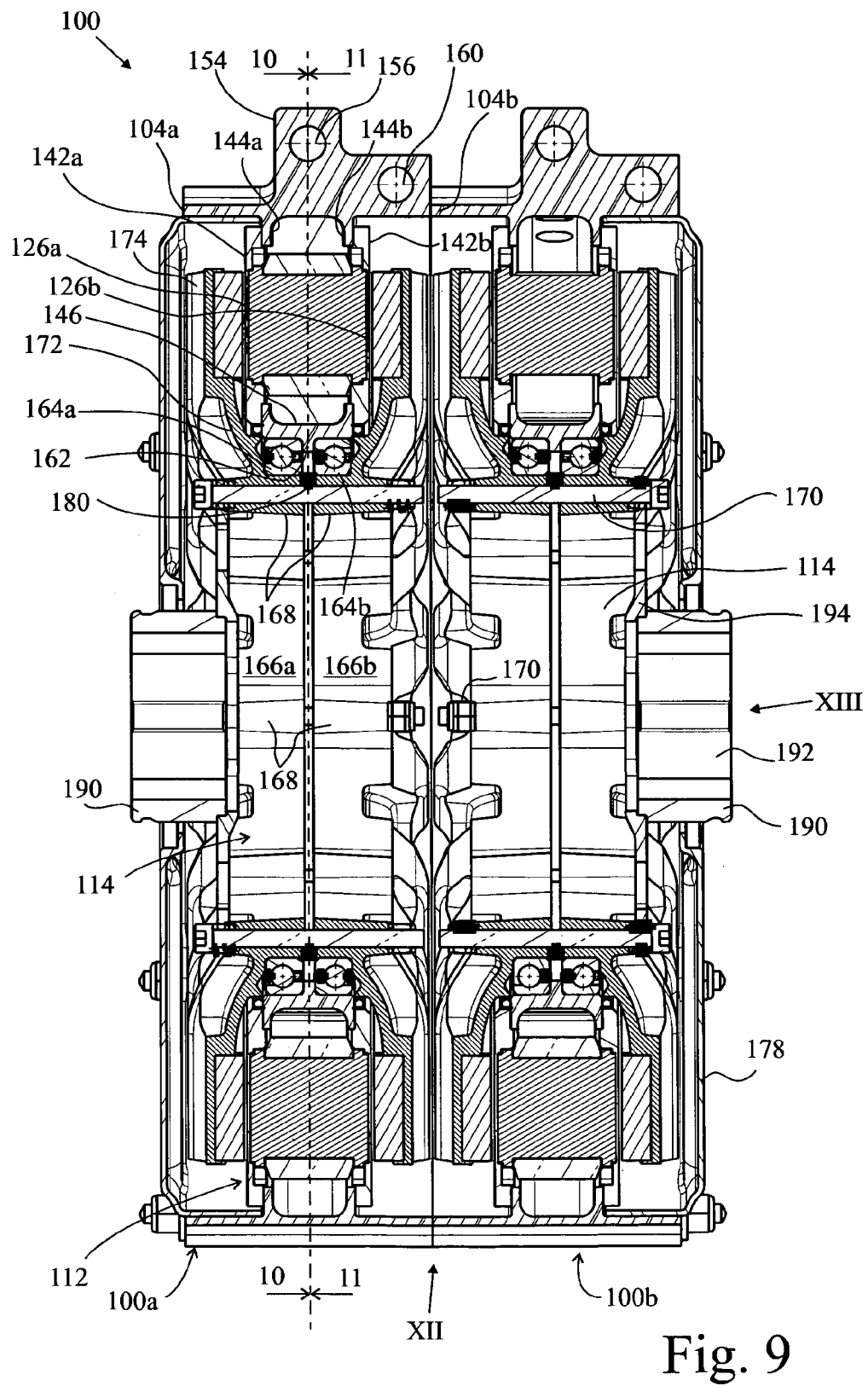

Turning to FIGS. 8 and 9, the inner stator housing 146 has a central internal flange 162 on either side of which are disposed bearings 164*a, b*. The bearings 164*a, b* mount rotors 114*a, b*. The rotors are connected together across internal flanges 166a, b. These are tubular and are provided with spaced bosses 168 to receive nuts and bolts 170 that connect the two rotors 114a, b together. Thus, the rotors 114a, b are, to all intents and purposes, a single, integral structure. Extending from the cylindrical flanges 166a, b are dish-shaped wings 172a, b that terminate in an annular section 174a, b on which magnets 124a, b are mounted. Indeed, the extensions 174a, b are preferably provided with pockets 176 to receive the magnets and firmly locate them.

Between the magnets 124a, b and the clamshells 142a, b are air gaps 126a, b. As will be well understood in motor technology, the air gaps should be as small as possible in order to reduce the reluctance of the magnetic circuit. However, the arrangement of the motor described with reference to FIGS. 7 to 13 permits a very narrow air gap to be engineered by virtue of the few manufacturing tolerances that have to be accommodated in assembly of the motor 100a, b. Because the bearings 164a, b represent a significant source of lost motion the rotors are adapted to apply a pre-stress to the bearings, which pre-stress is limited by a spacer 180 disposed between them. Of course, the axial dimension of the spacer can be honed to ensure a tight fit. However, apart from the bearing there are relatively few other components whose tolerances stack up and necessitate a large air gap. Of course, one such component is the stator 112 itself, for which the dimensions of the flanges 147a, b of the inner stator housing 146, and the depending flanges 144a, b, as well as the dimensions of the clamshells 142a, b, are critical in ensuring the smallest possible air gap 126a, b, despite the presence of a wall formed by the clamshell being included therein. Moreover, it is apparent that any stresses in the rotor will result in torsional (that is, about axes perpendicular to the rotation axis 120, or in linear stresses in that direction) that must be accommodated by the stator 112. However, the series of stator bars and shoes spanning the chamber 152 provide significant diagonal reinforcement within the chamber 152 to render the inner housing 146 extremely secure in an axial direction.

Furthermore, the concept of mounting the rotor 114 directly in the stator 112 has two further beneficial effects. The first is connected with the general principle of the motor design which demands that the magnets 124 and coils 122 be disposed as far as possible from the rotation axis 120 so that the magnetostrictive force acting between the coils and magnets translates into maximum torque about the rotation axis. This means, however, that, if the fixing of the rotor with respect to the stator is at distance that is not much less than the radius of the magnets/coils, the rotor must be very rigid over that distance. By mounting the rotor directly on the stator that distance is reduced and therefore the rotor need not be so rigid. Alternatively, the air gap can be smaller. Secondly, by connecting the rotor using a dish shaped annulus 172 that transforms into a tubular body 166, a further return path 30' (see FIG. 8) for the magnetic flux is created. At least, this is the case if the rotor is made from a ferromagnetic material. This additional flux path is advantageous because it reduces the requirement for the flux to confine itself to a circumferential direction in the flanges 174 between magnets but also permits an alternative return path for each magnet-coil-magnet circuit. The overall reluctance of the magnetic circuit is thereby reduced.

It should be appreciated that the axial force applied to each rotor due to the magnets is significant, and it increases as the air gap reduces and may be of the order of 7500N per rotor. As a result of this, the axial support of the rotors is extremely important and thus the bearing(s) between the stator and rotor need to provide a strong and stable reaction to this force. If the rotors are perfectly located on either side of the stator, there is a net axial force of zero, but to achieve this requires tight build tolerances and a stiff bearing assembly. However, by mounting the rotor directly inside the stator as described herein, that accuracy is achievable within reasonable cost. The flange 162 against which the bearings seat and locate, axially, is critical in this regard.

Indeed, with reference to FIGS. 8 and 11, there are certain geometrical features of an embodiment of a machine according to one aspect of the present invention. As mentioned above the coils 112 have an external radius $R_2$. By that is meant the radius of the smallest circle that encompasses all the coils. Likewise, they have an internal radius $R_1$, which correspondingly is the radius of the largest circle that fits within the confines of all the coils. The coils are sensibly arranged in a circle around the rotor axis 120, but that is not absolutely required. However, the radius r of the bearings 164a, b, being here the radius of the circle just touching the innermost part of the rolling elements of the bearings, is arranged as large as possible and is preferably related to stator radius $R_1$ by the expression:

$$r = k_1 * R_1$$

where $k_1$ is between 0.5 and 0.9 in value.

Indeed, the coils have radial ($C_1$) and circumferential ($C_2$) extents, where $$C_1 = R_2 - R_1.$$

Although the circumferential extent can be anything, it is defined as the centre-to-centre arc, centred on the rotor axis 120, between adjacent coils. However, one convenient motor has the following relationships:

$$R_1 = k_2 * R_2$$

; and $$C_1 = k_3 * C_2$$

Where $k_2$ is between 0.5 and 0.8, and $k_3$ is between 0.75 and 2.0.

In fact, the relationship may be taken further such that:

$$r = k * R_2$$

, where $$k = k_1 * k_2.$$

k preferably has a value between 0.3 and 0.6, and may be about 0.45 in one suitable arrangement.

Although the bearings 164a, b are shown as ball bearings having their own races, the design permits bearing surfaces to be formed on respective frusto-conical or cylindrical surfaces of the inner stator housing 146 and cylindrical flanges 166, and for taper roller bearings, confined to a cage, to be disposed between them. This can result in even tighter tolerances being achieved. As mentioned above, the rotor components are constructed from a ferromagnetic material such as steel and may be cast or forged and machined as required. However, the inner stator housing 146, and indeed the motor housing 102, is conveniently cast from non-magnetic material such as aluminium (alloy). Even aluminium can have a hardened bearing surface however. In this event, a flange 162 is not employed. In any event, the present design enables an air gap in the order of 1.0 mm (±0.1 mm) to be maintained at minimum manufacturing cost.

As mentioned above, the two motors 100a, b are independent. The rotors 114 are not connected to each other. However, they clearly could be, by disposing an appropriate spacer between them, and extending the bolts 170 so that they pass through both rotors. Indeed, there is nothing to prevent further motors being added in series, so that three or more motors could be employed in tandem. As can be seen in the drawings, the sides of the composite motor are closed by covers 178 that are a press fit inside internally-cylindrical extensions 102*c, d* of the motor housings 102. The covers are dished pressings and are a press fit inside the extensions 102*c, d* although other methods of fixing are conceivable. They have a central opening through which a motor out put 190 extends.

The output 190 comprises any suitable component and may be a shaft. Here, it is shown as a standard drive hub having a tripod-cup 192 for reception of a shaft (not shown) having a three-lobed yoke. A seal (not shown) would normally be disposed between the cover 178 and the hub 190 to isolate the internal environment of the motor 100. The hub 190 is connected by an annular disc 194 to the rotor 114. The disc 194 is secured to the rotor by the bolts and nuts 170, and to the hub 190 by bolts (not shown) in apertures 196 in the hub 190. Indeed, it is an aspect of the direct mounting of the rotor on the stator that the output configurations possible without any disturbance of the motor design is possible. Thus, the shaft-less topology allows for a wide variety of output configurations, including:

Automotive "constant velocity" (CV) joint housing;
Splined shaft (either male or female); and
Flat drive plate with any hole pattern.

In one application, in which the motor 100 illustrated in FIGS. 7 to 13 is particularly intended, the motor is arranged to drive two vehicle wheels. A further motor could be arranged to drive other pairs of wheels in multi-axle vehicles. The motor would be arranged substantially centrally between the wheels with drive shafts extending from each of the two drive hubs 190*a, b*. There would be no requirement for any differential, because each motor-slice could be driven independently with constant torque. The machine in this arrangement may operate as both a motor and a generator, particularly in hybrid vehicles, but certainly at least when employing regenerative braking.

As is evident from the description above, the covers 178 are merely dust excluders and protect the internal components of the machine 100. They have little if any structural role. The structural connections between a fixture (such as a vehicle in which the machine is disposed) and the output are as follows. The fixture is connected to the motor housing. The motor housing structurally mounts the stator. The stator structurally, although also rotationally, mounts the rotor. The rotor structurally mounts the output, which is not otherwise structurally supported by the motor housing. Here, the term "structurally" is being used in the sense that the mountings are the main or only mountings for the component in question. In many known scenarios, for example, a housing mounts a stator and also (rotationally) mounts a rotor. It could be suggested therefore that the stator mounts the rotor. However, such mounting is incidental and is not what is meant herein by structural mounting through the substantially exclusive agency of the component in question. Of course, in that regard, a seal disposed between the cover 178 and the hub 190 neither "mounts" the hub on the cover, let alone structurally, and does not disturb the fundamental structural mounting of the hub in the housing through the agency of the rotor and stator.

It can be seen that by mounting the rotor directly on the stator at a distance from the rotation axis, a substantial hollow space is created inside the rotor. Depending on the application, this provides an opportunity to dispose a gearbox, particularly a planetary gearbox, inside the motor. To some extent, in many circumstances with a machine of the present design, a gear box is not necessary because the electronics required to manage the coils can enable the machine to operate at a substantially constant maximum torque (subject substantially only to cooling limitations) over a wide range of speeds, for example torques of 500 Nm per motor slice, to rotational speeds in excess of 3000 rpm, are feasible. Nevertheless, this option is distinctly available.

This arrangement also has the advantage of facilitating interconnection of machines in tandem, because there is no requirement to disturb the journal arrangement of the rotor in the housing as would normally be the case where the rotor is supported in bearings fixed in the housing. Clearly, there is some scope for debate as to where a stator begins and a housing in which it is fixed ends. Indeed, the invention provides, in motor terms the following non-exclusive list of options:

(a) A single 500 Nm slice with a spline output;
(b) Two independently-controlled 500 Nm slices, each with their own CV-type output for automotive applications;
(c) Four slices joined as two pairs (1000 Nm per pair), each pair with a CV-type output, again potentially for (high performance) automotive applications;
(d) Four slices fixed rigidly together giving 2000 Nm;

Reference is made to FIG. 8, in which the bottom half differs from the top half of the drawing by virtue of the rotors 114*a, b* being interconnected by bolts 170*a* that extend through aligned bosses, although spaced by spacer sleeve 169. In fact, there is no reason why there should not be two outputs, as previously described, provided no differential is required, but in the lower half of FIG. 8, left-hand cover 178' is completely closed, and left-hand rotor 114*a* does not have a disc 194 and hub 190 connected to it. Instead drive is to (or from) a single hub 190 and disc 194 connected to the right-hand rotor 114*b*. Indeed, the four slice motor (not shown) can be made simply by continuing the addition of rotors 114 leftwardly in FIG. 8. Alternatively, a dual-drive four-slice motor can be achieved simply by mirroring the arrangement in the bottom half of FIG. 8, removing the continuous covers 178' and connecting the annular housings 102 of each pair together.

Another element to note is that a slice doesn't necessarily have to be a further motor slice 100*a, b*—it could be a separate gearbox slice to provide an alternative torque-speed balance. So, in example (a) above, the slice could be added to an epicyclic gearbox that steps the rotational speed down by, for example, a factor of 4:1. This would reduce the maximum output speed but will conversely give 2000 Nm torque (500 Nm×4) from a very light weight assembly. Of course, these figures apply to the topology illustrated in FIGS. 7 to 13 employing 18 stator poles and 20 magnets per rotor. However, other options are of course available, in either direction, down to 300 Nm and upwards of 1000 Nm.

Although the motor 100 of FIGS. 7 to 13 is shown without the features of the embodiments described above with reference to FIGS. 4 to 6, those features can advantageously be incorporated, as desired. Of course, the embodiments described with reference to FIGS. 4 and 5 are mutually exclusive.

Figure 14C:
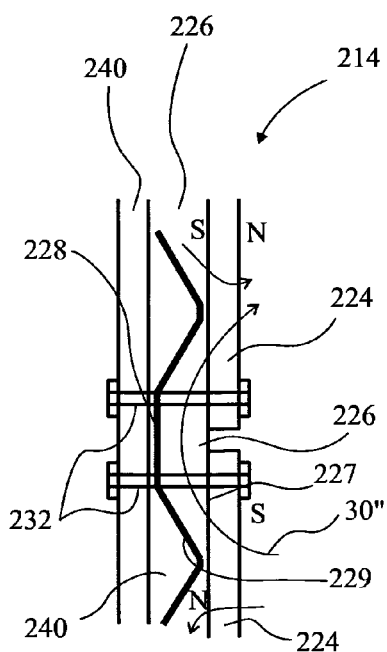
FIGS. 14a, b and c are a perspective view of the magnetic part of a rotor in accordance with another aspect of the present invention, a closer view of inset B in FIG. 14a, and a schematic side view of the magnetic part connected to a non magnetic base.
Figure 14A:
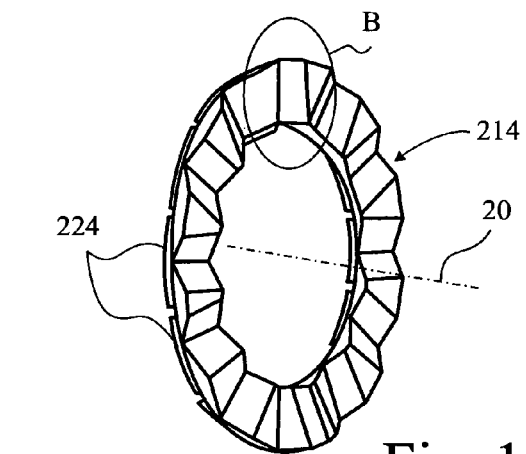
Figure 14B:
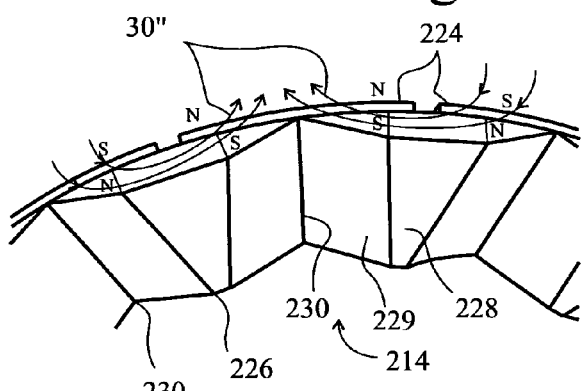

Turning to FIGS. 14*a, b* and *c* and 15*a* and *b*, two alternative forms of the magnetic part of a rotor is shown. In FIGS. 14*a, b* and *c*, a rotor disc 214 comprises an annulus of separate magnets 224 having their North-South poles arranged parallel the rotor axis. To the rear of each magnet and bridging adjacent ones of them are wedge shaped pieces 226 of magnetic material comprising the back iron for the magnetic return paths, optimized to minimize weight while maintaining the maximum low reluctance return path for the magnetic flux. In the side view in FIG. 14c, an aluminium or other non-magnetic substrate 240 (not shown in FIGS. 14a and b) may be cast in the shape of the rotor components 114a, b described above and shown in FIGS. 7 to 13.

The pieces 226 may conveniently be pressed from soft magnetic composite (SMC) material and have a central triangular ridge 228 that, when assembled, is symmetrically disposed around the radial direction with respect to the rotor axis. Each piece 226 has an edge 230 that is also radial with respect to the axis 20, when assembled, and is arranged centrally of the magnets 224. Between the edges 230 is, on one side, a plane face 227 that is in the radial plane and abuts the magnets 224 (except in the gap between them). On the other side, flanks 229 rise from the edges 230 to the ridge 228. Bolts 232 may be employed to bolt both the magnets 224 and back iron (or also referred to as connecting) pieces 226 to the substrate dish 240, the dish being seated on the flat ridges 228 of the pieces 226. Indeed, the gaps 240 may be left empty in order to encourage cooling airflow, or may be filled with for example, plastics material to improve rigidity.

The flux lines 30" encouraged by this arrangement are shown in FIGS. 14a and c. While this embodiment does not exhibit the return path 30' around the bearings as described above, nevertheless, the weight and ease of manufacture of the rotor 214 might be more important than outright motor efficiency. Being able to construct the substrate 240 from a non magnetic material enables it to be cast from a light material such as aluminium having maximum strength by virtue of the shape it can be provided with.

Figure 15B:
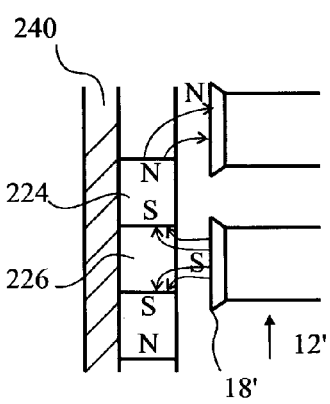
FIGS. 15a and b are a perspective view of the magnetic part of a rotor in accordance with a still further aspect of the present invention, and a schematic side view of the magnetic part connected to a non-magnetic base.
Figure 15A:
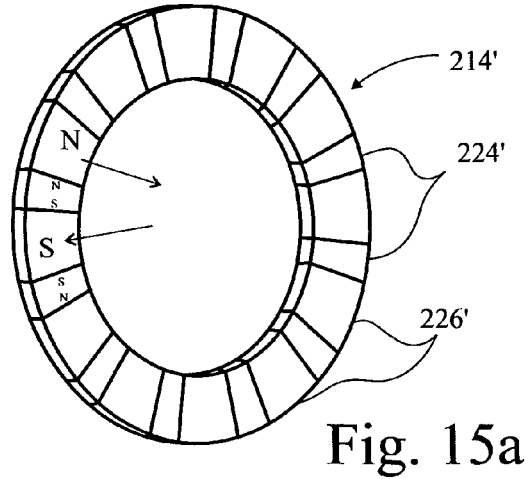

In FIG. 15a and b, a still further embodiment of rotor magnetic part 214' is shown. As with the arrangement of FIGS. 14a, b and c, this part is intended to be mounted in a non-magnetic carrier 240 such as aluminium or the like. Different from the previous embodiment, however, here, the part 214' comprises an annular disc of alternating permanent magnet elements 224' and ferromagnetic connecting pieces 226'. The magnets 224' are oriented with their magnetic axes in a circumferential direction, orthogonal with respect to the magnets of the previous arrangement. The polarity of the magnets alternates between adjacent magnets so that the flux is driven out of the connecting pieces towards the shoes 18' of the stator 12' (or sucked in from the shoes) so that the connecting pieces effectively adopt the role of the magnetic poles insofar as the stator 12' is concerned, and as indicated in FIGS. 15a and b.

The primary purpose of the arrangement in FIG. 15a is, of course, to reduce the cost and weight of the motor. This is not to suggest that, magnetically, this is a better arrangement, but the mass of relatively heavy magnetic elements is reduced, whereby a lighter machine is rendered possible.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

[1] T J Woolmer and M D McCulloch "Analysis of the Yokeless and Segmented Armature Machine", International Electric Machines and Drives Conference (IEMDC), 3-5 May 2007

The invention claimed is:

1. An electric machine comprising a rotor having a rotation axis for rotation with respect to a stator, the rotor having permanent magnets and a stator having coils wound on stator bars for interaction with the magnets across an air gap defined between them, wherein the bars have shoes that link magnetic flux through the bars with said magnets, and wherein the bars and shoes are formed separately from one another and at least a part of the shoe is formed by moulding soft-iron particles so that the particles have a short dimension that is arranged transverse a reluctance-plane of the shoe, said reluctance-plane of the shoe being a plane of minimum reluctance of the shoe, the bars include a rolled sheet of ferromagnetic material whose axis of roll is arranged parallel a longitudinal axis of the bar and defines a reluctance plane of the bar, the reluctance plane of the bar being a plane of minimum reluctance of the bar, and the bars and shoes are assembled so that said reluctance-plane of the bar is parallel a longitudinal axis of the bar and said reluctance-plane of the shoe is transverse said longitudinal axis.

2. An electric machine as claimed in claim 1, in which the particles of the shoes have a single longitudinal dimension, and said reluctance-direction is radial with respect to said longitudinal axis when the bars and shoes are assembled.

3. An electric machine as claimed in claim 1, in which said moulding of said soft-iron particles is by pressing round soft iron particles in a direction transverse to said reluctance-plane of the shoe whereby the particles are flattened to produce said short dimension.

4. An electric machine as claimed in claim 1, in which said moulding is of already flattened particles, or of already elongate particles.

5. An electric machine as claimed in claim 4, in which elongate particles are aligned prior to moulding by use of a magnetic field.

6. An electric machine as claimed in claim 1, in which the rotor has two stages arranged one at either end of the bars and shoes are provided at each end of each bar.

7. An electric machine as claimed in claim 1, in which the machine is an axial flux machine and the bars are arranged parallel the rotor rotation axis.

8. An electric machine as claimed in claim 1, in which said roll is disposed around a shaped soft-iron pressed-particle core, whereby the cross section of the bar perpendicular said longitudinal axis is substantially trapezoidal.

9. An electric machine as claimed in claim 1, in which said roll is the core of a shaped annulus of pressed soft-iron particles, whereby the cross section of the bar perpendicular said longitudinal axis is substantially trapezoidal.

10. An electric machine comprising a rotor having a rotation axis for rotation with respect to a stator, the rotor having permanent magnets and the stator having coils wound on stator bars for interaction with the magnets across an air gap defined between them, wherein the bars have shoes that link magnetic flux through the bars with said magnets, and wherein the bars and shoes are formed separately from one another and at least a part of the shoe is formed by moulding soft-iron particles so that the particles have a short dimension that is arranged transverse a reluctance-plane of the shoe, said reluctance-plane of the shoe being a plane of minimum reluctance of the shoe, the bars include molded soft-iron particles so that the particles have a short dimension that is arranged transverse a reluctance plane of the bar, said reluctance-plane of the bar being a plane of minimum reluctance of the bar, and the bars and shoes are assembled so that said reluctance-plane of the bar is parallel a longitudinal axis of the bar and said reluctance-plane of the shoe is transverse said longitudinal axis.

11. An electric machine as claimed in claim 10, in which said particles of at least the bars have a single longitudinal dimension and said particles are also aligned so that their longitudinal dimension is parallel a reluctance-direction in said reluctance-plane of the bar, said reluctance-direction of the bars being parallel said longitudinal axis of the bar.

12. The electric machine as claimed in claim 10, in which said moulding of said soft-iron particles is by pressing round soft iron particles in a direction transverse to said reluctance-plane of the bar whereby the particles are flattened to produce said short dimension.

13. The electric machine as claimed in claim 10, in which said moulding is of already flattened particles, or of already elongate particles.

14. The electric machine as claimed in claim 13, in which elongate particles are aligned prior to moulding by use of a magnetic field.

15. The electric machine as claimed in claim 10, in which the rotor has two stages arranged one at either end of the bars and shoes are provided at each end of each bar.

16. The electric machine as claimed in claim 10, in which the machine is an axial flux machine and the bars are arranged parallel the rotor rotation axis.

* * * * *